United States Patent [19]

Katoh et al.

[11] Patent Number: 5,561,460
[45] Date of Patent: Oct. 1, 1996

[54] SOLID-STATE IMAGE PICK UP DEVICE HAVING A ROTATING PLATE FOR SHIFTING POSITION OF THE IMAGE ON A SENSOR ARRAY

[75] Inventors: Makoto Katoh; Koji Ichie, both of Hamamatsu, Japan

[73] Assignee: Hamamatsu Photonics K.K., Shizuoka-ken, Japan

[21] Appl. No.: 253,133

[22] Filed: Jun. 2, 1994

[30] Foreign Application Priority Data

Jun. 2, 1993 [JP] Japan ................................. 5-132215

[51] Int. Cl.⁶ ................................................ H04N 5/225
[52] U.S. Cl. .................................................. 348/219
[58] Field of Search ................................. 348/207, 219, 348/220, 218; 250/208.1; H04N 5/225

[56] References Cited

U.S. PATENT DOCUMENTS

| | | | |
|---|---|---|---|
| 3,046,334 | 7/1962 | Roe | 178/7.2 |
| 4,633,317 | 12/1986 | Uwira et al. | 348/219 |
| 4,638,321 | 1/1987 | Milch | 348/208 |
| 4,641,038 | 2/1987 | Baker | 250/208.1 |
| 4,920,418 | 4/1990 | Robinson | 348/219 |
| 4,967,264 | 10/1990 | Parulski et al. | 348/336 |
| 5,291,327 | 3/1994 | McEwen | 359/209 |

FOREIGN PATENT DOCUMENTS

| | | | |
|---|---|---|---|
| 20133890 | 3/1985 | European Pat. Off. | H04N 5/335 |
| 20474479 | 3/1992 | European Pat. Off. | H04N 5/33 |
| 60-112377 | 6/1985 | Japan | H04N 5/335 |
| 60-149267 | 8/1985 | Japan | H04N 5/335 |
| 61-236282 | 10/1986 | Japan | H04N 5/335 |
| 3276981 | 12/1991 | Japan | H04N 5/335 |
| 2152781 | 8/1985 | United Kingdom | H04N 3/15 |
| 8605641 | 9/1986 | WIPO | H04N 1/18 |
| 9015499 | 12/1990 | WIPO | H04N 1/46 |

Primary Examiner—Yon J. Couso
Assistant Examiner—Tuan V. Ho
Attorney, Agent, or Firm—Sughrue, Mion, Zinn, Macpeak & Seas

[57] ABSTRACT

Incident light is refracted by a planar plate 30 which is fixedly slanted with respect to the optical axis, before being imaged on an image receiving surface of an image sensor 10. The planar plate 30 rotates about the optical axis or an axis parallel to the optical axis. In accordance with the rotational movement of the planar plate, the incident light imaged position moves on the image receiving surface of the image sensor 10. Light portions originally imaged on gap areas between neighboring light pick up elements of the image sensor 10 move into the light pick up elements. The image sensor can therefore pick up those image portions which are originally imaged on the gap areas and therefore which may not be picked up by the image sensor. Picking up an image every time when its image position moves and composing thus obtained images by the composing device 70 can obtain a high quality image which has little area of image portions which are imaged on the gap areas between the light pick up elements and therefore which are not picked up.

26 Claims, 15 Drawing Sheets

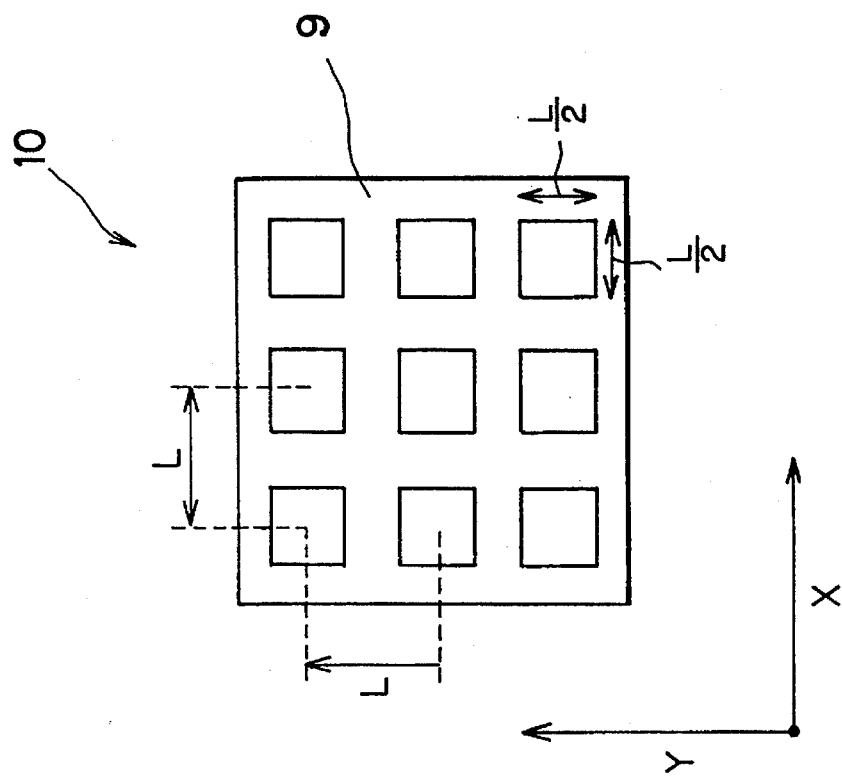
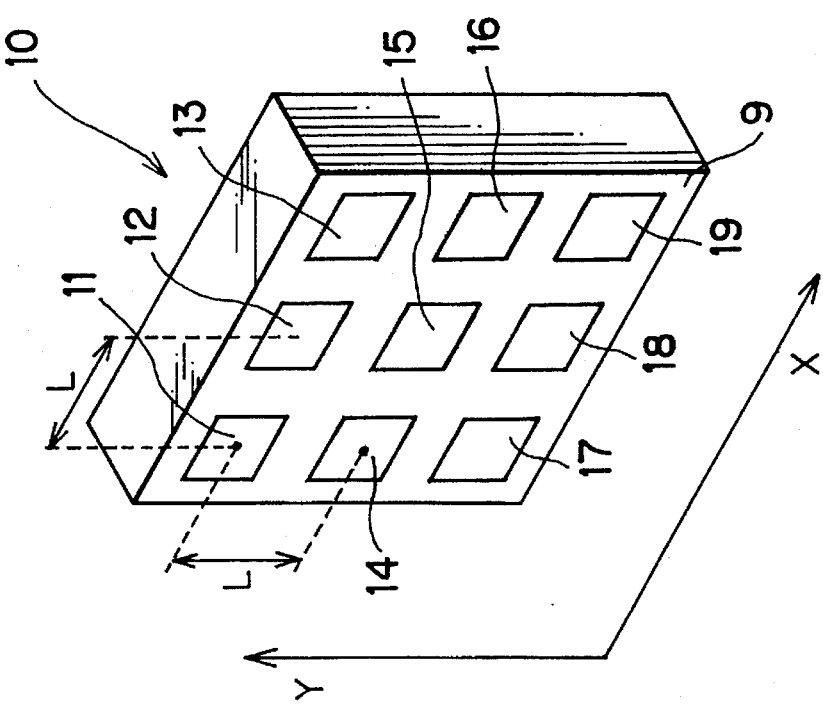
FIG. 4A
FIG. 4B $$\sin \theta = n \sin \theta'$$

$$\Delta = \frac{d}{\cos \theta'} \sin(\theta - \theta')$$

$$= d \sin \theta \left(1 - \frac{\cos \theta \sin \theta'}{\cos \theta' \sin \theta}\right)$$

$$= d \sin \theta \left(1 - \frac{\cos \theta}{\sqrt{n^2 - \sin^2 \theta}}\right)$$

SOLID-STATE IMAGE PICK UP DEVICE HAVING A ROTATING PLATE FOR SHIFTING POSITION OF THE IMAGE ON A SENSOR ARRAY

BACKGROUND OF THE INVENTION

1. Field of the Invention

The present invention relates to a solid-state image-pickup device for obtaining a high quality image with the use of a solid-state image sensor comprised of a plurality of light pick-up elements.

2. Description of the Related Art

A solid-state image sensor employed in a solid-state image pick up device has a plurality of solid-state light pick up elements arranged both in the horizontal and vertical directions. Each of the plurality of solid-state light pick up elements stores an electric charge corresponding to its received picture element light ray, and transfers the stored electric charge to a nearby light pick up element, to thereby pick up an image. The image resolution obtainable by the solid-state image pick-up device therefore depends on a density at which the plurality of light pick up elements are arranged.

There is known a solid-state image pick up device for obtaining a high quality image with the use of the solid-state image sensor as described in Japanese Unexamined Patent Application Publication KOKAI No. 3-276981. As shown in FIG. 1, the solid-state image pick up device 200 includes a lens 201 for converging light from an object to be imaged, a solid-state image sensor 202, and a pair of transparent refraction plates 203 and 204 located between the lens 201 and the solid-state image sensor 202. The transparent refractive plates 203 and 204 are mounted on stepper motors 205 and 206, respectively. The stepper motors 205 and 206 are driven by a driving circuit 208 to stepwisely rotate the transparent refractive plates 203 and 204. Due to the rotations, the refraction plates 203 and 204 slant relative to the optical axis of the lens 201 so as to refract light from the lens 201 in two directions to thereby shift a position, on the image sensor 202, at which the light ray focused or imaged by the lens 201 reaches. Generally, the image sensor 202 may not pick up portions of a light image that reach boundaries or gap areas between neighboring light pick up elements. However, thus shifting the positions at which light is focused on the image sensor 202 enables the image sensor 202 to pick up those image portions which will be focused on the gap areas if the plates 203 and 204 are not provided. The image sensor 202 is driven to repeatedly pick up the received images in synchronism with the stepwise rotation of the refraction plates 204 and 205. A plurality of images thus picked up by the image sensor are composed or synthesized into a final image in an image signal processing device 207. The final image is then outputted from the device 207. As a result, a high resolution image with little areas of unpicked image portions is obtained.

In this conventional solid-state image pick up device 200, however, even slight rotations of the refraction plates 203 and 204 induce a large shift of the light-focused position on the image sensor 202. It is therefore necessary to finely control the rotation angle of each of the refraction plates 203 and 204. For example, if thickness t and refractive index n of each refraction plate are 2 mm and 1.5, in order to obtain a shift amount × of 5 μm by each refraction plate, the refraction plate has to be controlled to rotate by only 0.4 degrees. The stepper motors 205 and 206 therefore require a high mechanical accuracy for finely controlling the rotation angle of as small as 0.4 degrees.

Additionally, the conventional solid-state image pick up device 200 has a large size provided with the two refraction plates 203 and 204 and the two stepper motors 205 and 206.

SUMMARY OF THE INVENTION

It is therefore, an object of the present invention to overcome the above-described drawbacks, and to provide an improved solid-state image pick up device that enables to pick up an image of a high quality resolution with an easy operation and with a simple structure.

These and other objects of the present invention will be attained by providing a solid-state image pick up device for picking up an optical image, comprising: an image sensor having an image receiving surface; an optical system for imaging an incident light, which bears thereon an optical image, on the image receiving surface of the image sensor; a transparent planar plate provided with two opposite planar surfaces parallel to each other, the transparent planar plate being located in front of the image receiving surface of the image sensor and slanted with respect to an optical axis of the optical system by a predetermined slanted angle for refracting the incident light from the optical system; drive means for rotating the planar plate about one of the optical axis and an axis parallel to the optical axis by a predetermined rotational angle while maintaining the predetermined slanted angle; and composing means for composing, into a final composite image, a plurality of optical images each being picked up by the image sensor every time when the drive means rotates the planar plate by the predetermined rotational angle.

The drive means preferably rotates the planar plate about the optical axis to successively locate the planar plate at a plurality of rotational positions, and the image sensor preferably picks up the plural optical images formed at the time when the planar plate is located at the plurality of rotational positions.

Preferably, the image receiving surface of the image sensor is located normal to the optical axis and has a plurality of light pick up elements arranged thereon. The planar plate may be slanted with respect to the optical axis to form the predetermined slanted angle θ defined between the optical axis and a normal line normal to the planar plate satisfying the equation $$\Delta = d\sin\theta \left(1 - \frac{\cos\theta}{\sqrt{n^2 - \sin^2\theta}}\right)$$

where d and n are thickness between the opposite surfaces and refractive index of the planar plate, to thereby cause a plurality of image portions constituting the optical image formed on the image receiving surface that are originally located equidistant from each of the plurality of light pick up elements with a distance Δ to enter the corresponding light pick up element to be picked up thereby.

The drive means may rotate the planar plate while maintaining the predetermined slanted angle θ to successively locate the planar plate in the plurality of rotational positions where a directional plane of the planar plate, along which the normal line and the optical axis both extend, extends in a plurality of directions corresponding to the rotational positions, to thereby successively cause a plurality of image portions constituting the optical image formed on the image receiving surface that are originally located equidistant from each of the plurality of light pick up elements with the distance Δ in the plurality of directions to shift and enter the corresponding light pick up element to be picked up thereby.

According to another aspect, the present invention provides a solid-state image pick up device, for picking up an optical image, comprising: an image sensor having an image receiving surface, on which a plurality of light pick up elements are arranged with a predetermined interval; an optical system having an optical axis for introducing therealong a light beam bearing an optical image thereon to the image receiving surface of the image sensor, the optical system forming the optical image on the image receiving surface in such a state that a plurality of picture elements constituting the optical image are arranged to be located equidistant from at least one of the plurality of light pick up elements with a predetermined distance in a plurality of predetermined directions; a transparent planar plate having two opposite planar surfaces parallel with each other, the transparent planar plate being located between the optical system and the image sensor for receiving the light beam from the optical system and guiding the light beam to the image sensor, the transparent planar plate being slanted with respect to the optical axis by a slanted angle determined dependently on the predetermined distance so as to refract the light beam to shift the picture elements formed on the image receiving surface by a shift amount equal to the predetermined distance; drive means for rotating the planar plate about one of the optical axis and an axis parallel to the optical axis while maintaining the slanted angle to locate the planar plate in a plurality of rotational positions determined dependently on the plurality of predetermined directions, the planar plate located in each of the plurality of rotational positions refracting the light beam in a corresponding one of the predetermined directions by the predetermined shift amount to thereby cause the picture elements to enter the corresponding at least one light pick up element; control means for controlling the image sensor to pick up the picture elements which are caused by the planar plate located in each of the plurality of rotational positions to enter the corresponding light pick up elements; and composing means for composing the picture elements picked up by the image sensor into a final composite image.

Preferably, the optical system forms the optical image on the image receiving surface in such a state that the plurality of picture elements are located equidistant from the at least one light pick up elements with the predetermined distance Δ. The planar plate is preferably slanted with respect to the optical axis to form the slanted angle θ defined between the optical axis and a normal line normal to the two opposite surfaces of the planar plate satisfying the equation $$\Delta = d\sin\theta \left( 1 - \frac{\cos\theta}{\sqrt{n^2 - \sin^2\theta}} \right)$$

where d and n are thickness and refractive index of the planar plate.

The drive means may rotate the planar plate to locate the planar plate in each of the plurality of rotational positions where a directional plane of the planar plate, along which the normal line and the optical axis both extend, extends along a corresponding one of the plurality of directions.

BRIEF DESCRIPTION OF THE DRAWINGS

The above and other objects, features and advantages of the invention will become more apparent from reading the following description of the preferred embodiment taken in connection with the accompanying drawings in which:

FIGS. 4A and 4B are a perspective view and a plan view both schematically showing how light pick up elements are arranged on an image-receiving surface 9 of an image sensor 10 of FIGS. 2 and 3;

DETAILED DESCRIPTION OF THE PREFERRED EMBODIMENTS

Figure 1:
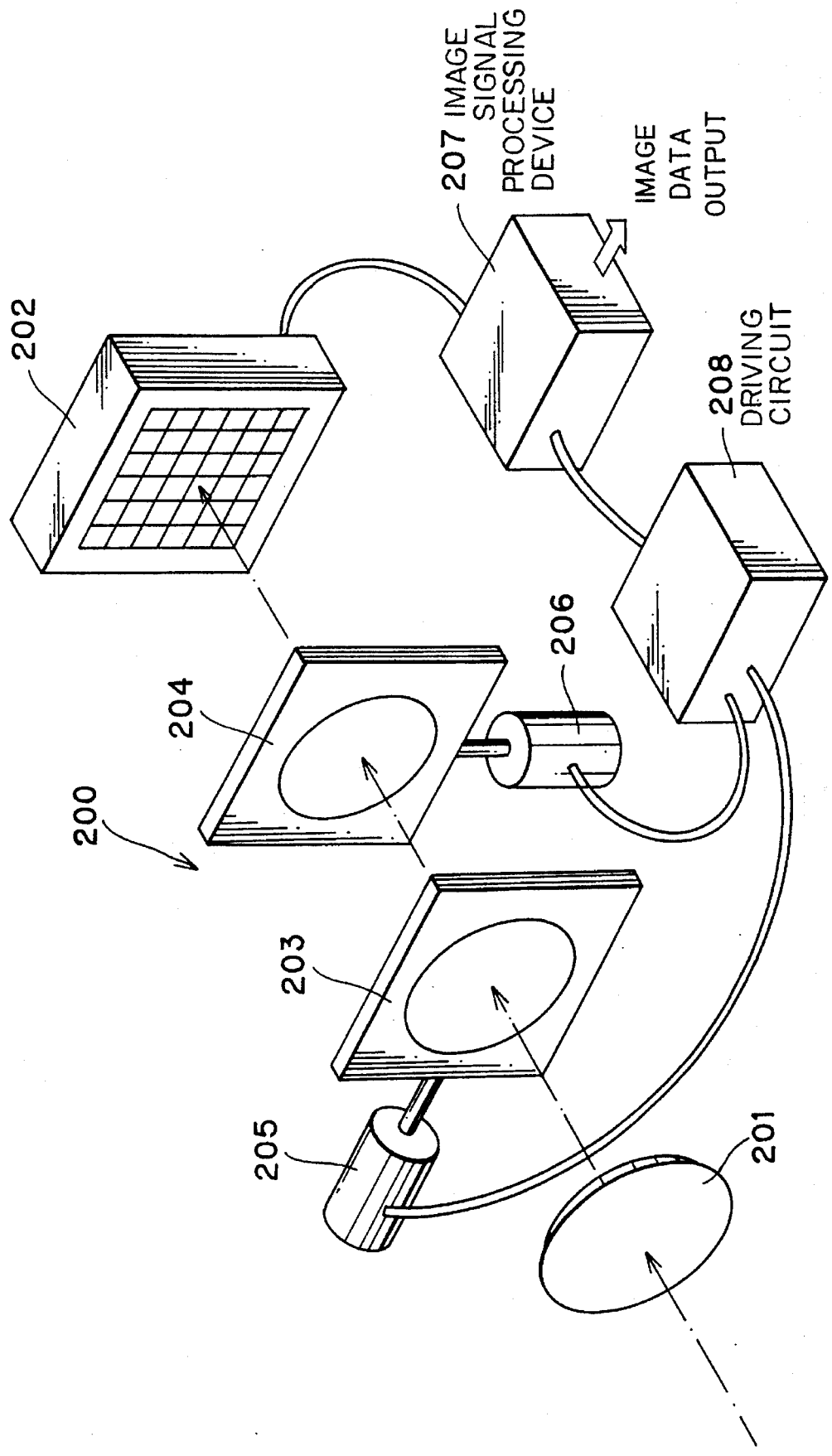
FIG. 1 is a perspective view of a conventional solid-state image pick up device.

Referring to the accompanying drawings, a preferred embodiment of the invention will be described wherein like parts and components are designated by the same reference numerals to avoid duplicating description.

Figure 2:
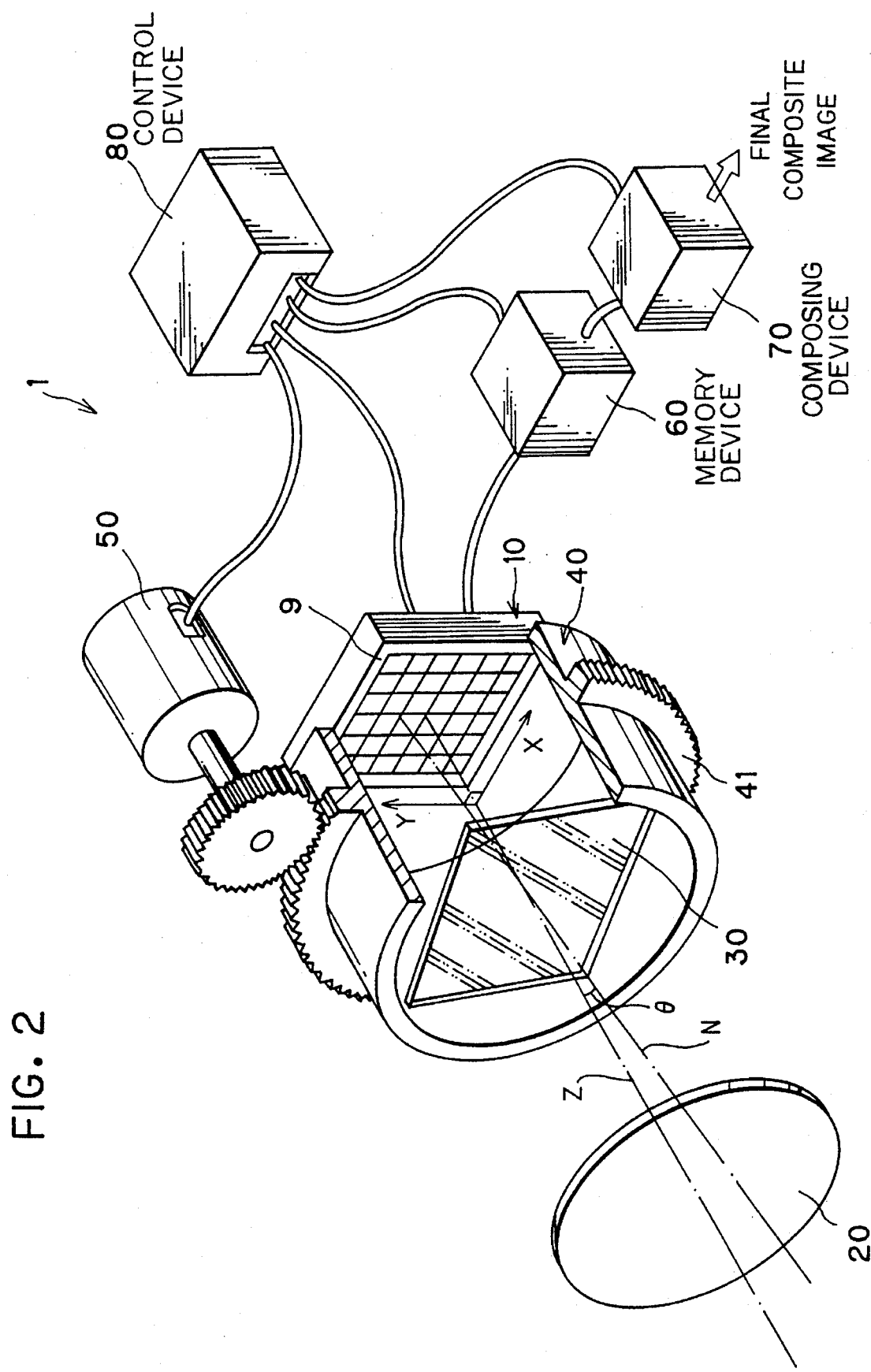
FIG. 2 is a perspective view showing a structure of a solid-state image pick up device of an embodiment of the present invention.
Figure 3:
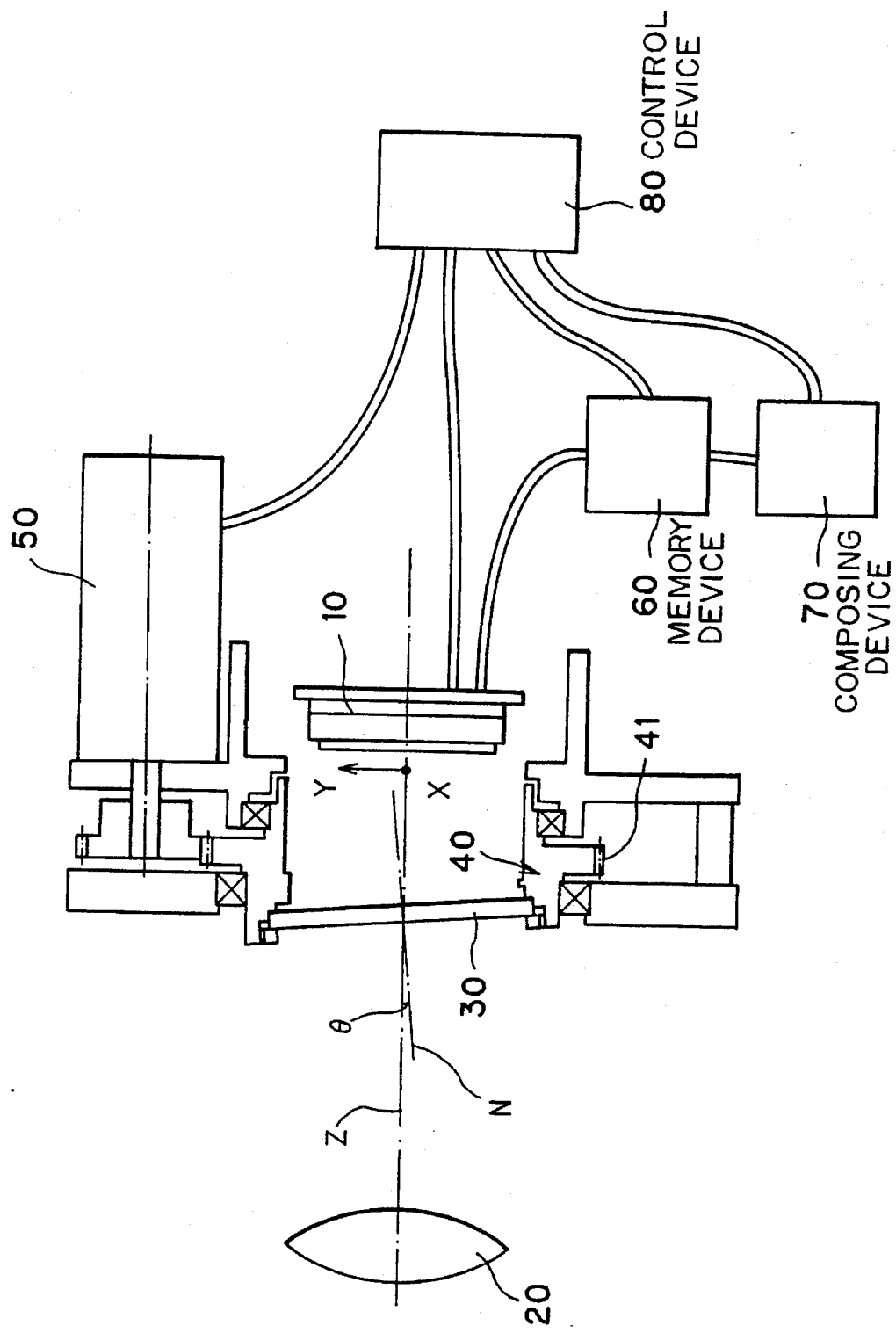
FIG. 3 is a sectional view taken along an optical axis Z of FIG. 2.

A structure of a solid-state image pick up device of the embodiment will be first described below, with referring to FIGS. 2 and 3. The solid-state image pick up device 1 of this embodiment includes: a solid-state image sensor 10 having an image receiving surface 9 for picking up an incident light image; a converging lens 20 for imaging the incident light image onto the image receiving surface 9 of the image sensor 10; a transparent glass plate 30 located between the converging lens 20 and the image sensor 10 for transmitting therethrough the incident light image from the converging lens 20; and a cylindrically-shaped rotational stand 40 for fixedly mounting the planar glass plate 30 therein so that the plate 30 is slanted with respect to an optical axis Z of the converging lens 20.

The solid-state image sensor 10 is a charge-coupled device image sensor (CCD image sensor), for example. The image sensor is located so that the image receiving surface 9 is positioned on a focal plane of the lens 20 that extends along an X-Y plane normal to the optical axis Z. The image sensor 10 has a plurality of light pick up elements arranged on the image receiving surface 9 each for picking up light received thereon. In the case where the image sensor 10 is a CCD image sensor, for example, the image sensor is made from a silicon substrate. A plurality of electrodes are arranged on an insulating oxide layer provided over the silicon substrate. Each of the plurality of electrodes therefore defines each of the plurality of light pick up elements of the image sensor.

The transparent glass plate 30 has two opposite planar surfaces extending parallel to each other. In other words, the plate 30 has a uniform thickness. This plate 30 will be referred to as a "planer plate 30," hereinafter.

The device 1 further includes: a stepper motor 50 for rotating the rotational stand 40 about the optical axis Z; a memory device 60 for storing a plurality of images repeatedly picked up by the image sensor 10; a composing device 70 for composing the plurality of images stored in the memory device 60 into a final image; and a control device 80 for controlling timings at which the image sensor 10 picks up the incident light image, a driving operation of the stepper motor 50, etc.

According to the present embodiment, the transparent plate 30 is mounted in the rotational stand 40 in such a state that the plate 30 is fixedly slanted by a predetermined slanted angle θ with respect to the optical axis Z. The rotational stand 40 is rotatable about its rotational axis which extends along the optical axis Z. The rotational stand 40 can therefore rotate the plate 30 about the optical axis Z while maintaining the slanted angle θ. Thus rotating the rotational stand 40 about the optical axis Z successively locates the plate 30 at a plurality of predetermined rotational positions where the slanted plate 30 faces in directions corresponding to the predetermined rotational positions. The plate 30 located on each of the predetermined rotational positions receives and refracts light from the lens 20 in the corresponding direction. Thus refracted light is imaged on the image receiving surface 9 of the image sensor 10 at a position that is shifted from an original position where the incident light is imaged if the plate 30 is not provided or the plate 30 is provided normal to the optical axis Z. The shift amount Δ is determined dependently on the slanted angle θ of the plate 30, and the shift direction is determined dependently on the corresponding rotational position of the plate 30.

In accordance with the rotational movement of the plate 30, the incident light imaged position successively shifts or moves along the image receiving surface 9 of the image sensor 10. Respective light portions originally imaged on the gap areas between neighboring light pick up elements successively enter the light pick up elements. The image sensor 10 therefore picks up those image portions that are originally imaged on the gap areas and therefore that may not be picked up by the image sensor 10 if the plate 30 is not provided or provided normal to the optical axis Z. Picking up an incident image every time when its imaged position shifts and composing thus obtained plural images by the composing device 70 can pick up any desired image with high quality, that is, with little areas of image portions that are imaged on the gap areas and therefore that are not picked up.

The structure of the solid-state image pick up device 1 of this embodiment will be described in more detail below.

As shown in FIGS. 4A and 4B, now assume that the image sensor 10 has nine light pick up elements 11 through 19 arranged with an interval L both in the X direction (horizontal direction) and the Y direction (vertical direction) of the X-Y plane. Each light pick up element has a square shape with its side length of L/2, for example. It is therefore apparent that the centers of the light pick up elements 11 through 19 are two-dimensionally arranged with the interval L.

Figure 5B:
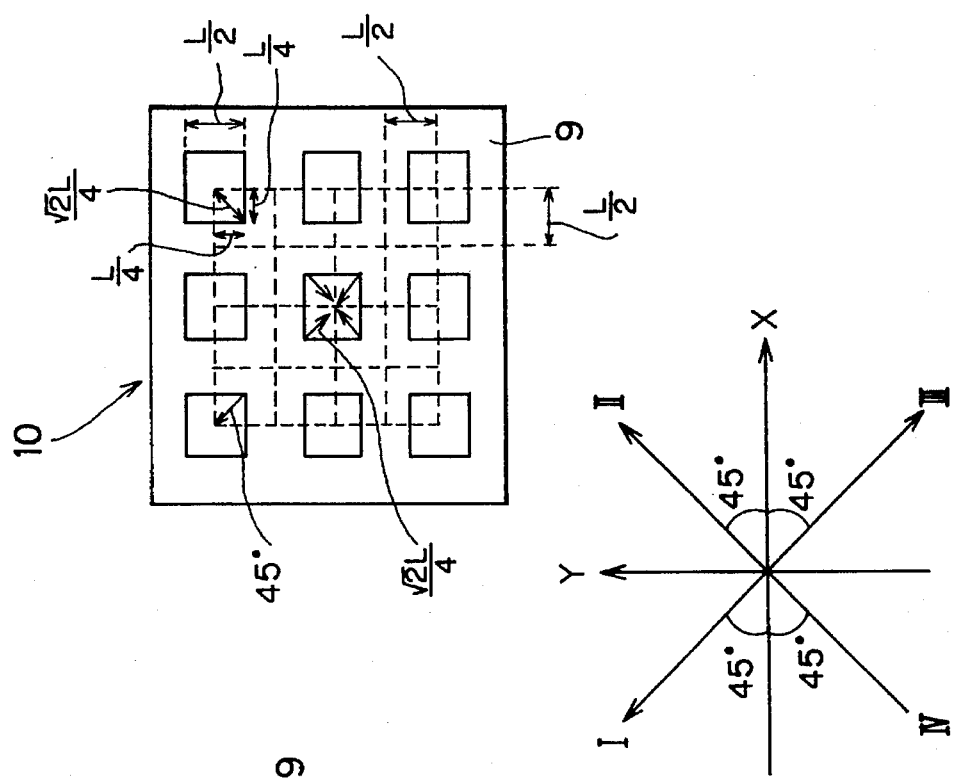
FIGS. 5A and 5B are a perspective view and a plan view both schematically showing how an optical image consisting of a plurality of picture elements a–p are imaged on the image-receiving surface 9 of the image sensor when a glass plate 30 is not provided.
Figure 5A:
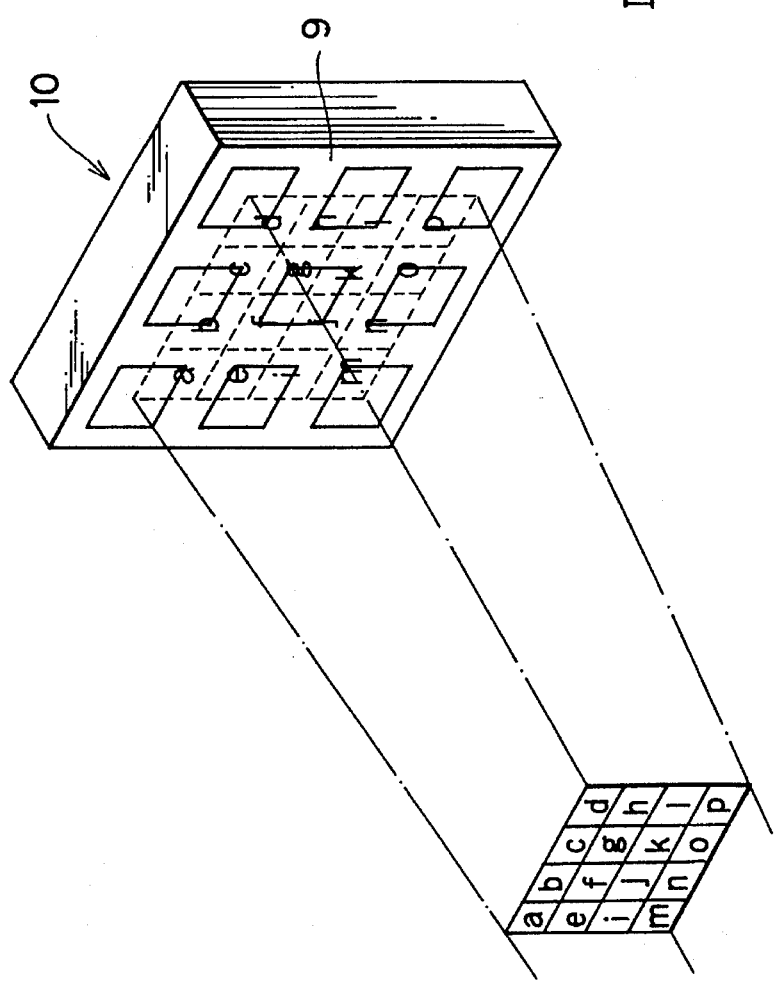

The converging lens 20 operates to form an arbitrary optical image on the image-receiving surface 9 of the image sensor 10. Now assume that the optical image consists of sixteen image portions or picture elements a through p arranged both vertically and horizontally as shown in FIGS. 5A and 5B. The converging lens 20 images, on the image-receiving surface 9, the optical image with its picture elements a through p being arranged with an interval L/2 both in the X and Y directions. Each of the image portions a–p is of a square shape with its side length of L/2, for example. The picture elements a through p are positioned substantially at the gap areas between the neighboring light pick up elements 11–19. The centers of the image portions a–p are located equidistant from the centers of their neighboring light-receiving pick up elements 11–19. In this embodiment, the planar plate 30 mounted on the rotatable stand 40 can shift all the image portions a–p into their neighboring light-pick up elements to thereby enable the image sensor 10 to pick up all the image portions, as will be described below.

When the transparent planar glass plate 30 is not provided or is provided normal to the optical axis Z, the sixteen picture elements a through p are imaged on the image receiving surface 9 to be arranged with the interval L/2 with their centers being located on the vertices of the square-shaped light pick up elements 11–19. Because the picture elements a–p are thus located substantially at the gap areas between the neighboring light pick up elements 11–19, the light pick up elements 11–19 may not properly pick up the respective picture elements a–p.

In order to enable the light pick up elements 11–19 to properly pick up the respective picture elements a to p, the picture elements a through p should be shifted to match their centers with the centers of their neighboring light pick up elements 11–19. The distance between the centers of all the picture elements and the centers of their neighboring light pick up elements has the same value Δ defined by the following equation (1):

$$\Delta = \sqrt{\left(\frac{L}{4}\right)^2 + \left(\frac{L}{4}\right)^2} = \frac{\sqrt{2}L}{4} \tag{1}$$

Accordingly, the picture elements a–p should be shifted by this shift amount Δ. According to the present invention, the glass plate 30 is provided in order to shift each picture element by the desired shift amount Δ. In order to obtain the desired shift amount Δ, the glass plate 30 should be slanted by a slanted angle θ with respect to the optical axis Z of the lens 20. In other words, a line L extending normal to the planar plate 30 (which will be referred as a "normal line N," hereinafter) should be slanted by the slanted angle θ corresponding to the shift amount Δ, as will be described in detail below.

Figure 12:
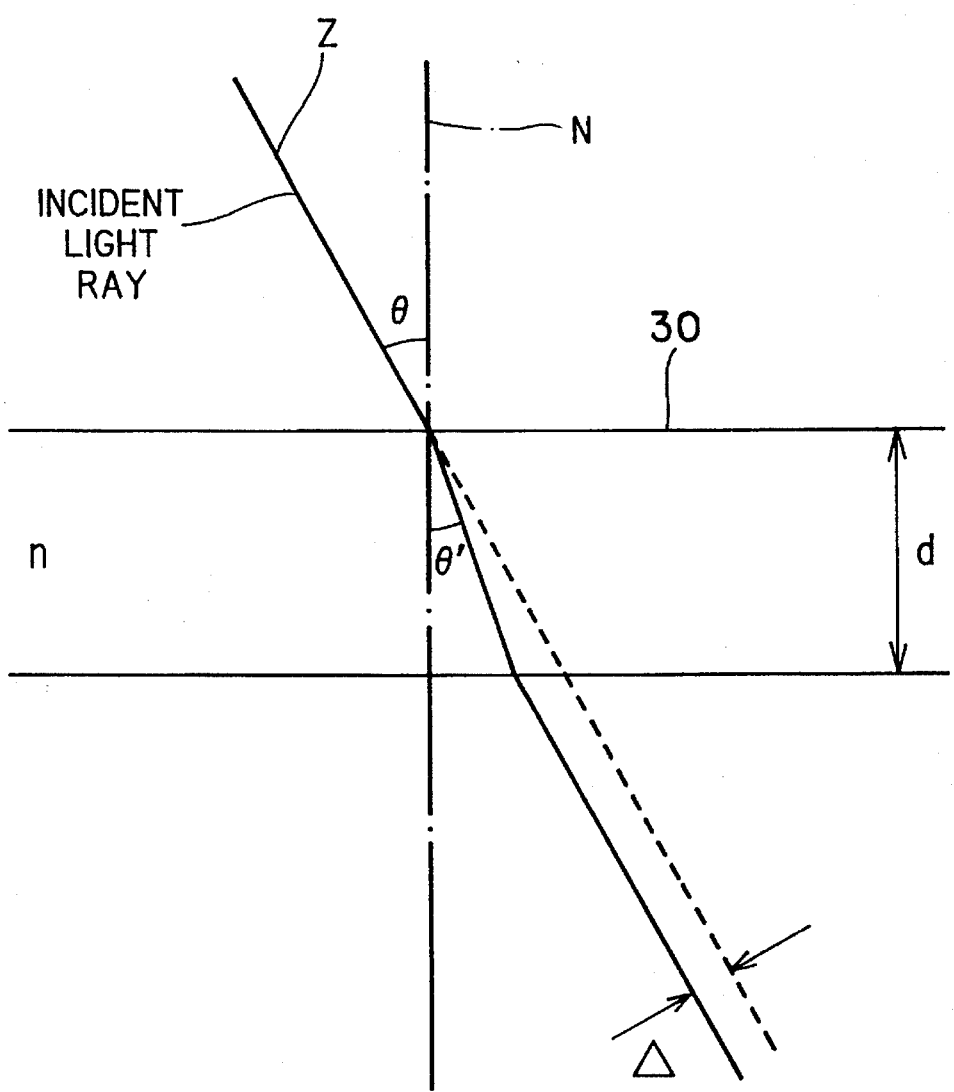
FIG. 12 is a sectional view showing the manner how incident light is refracted by the glass plate 30.

As shown in FIG. 12, when a light ray is incident on the plate 30 which is slanted by the slanted angle θ with respect to the optical axis Z, the light ray is refracted by the plate. As a result, a position at which the light ray outputs from the plate is shifted from the position at which the light ray enters the plate by the shift amount Δ satisfying the following equation (2):

$$\Delta = d\sin\theta \left(1 - \frac{\cos\theta}{\sqrt{n^2 - \sin^2\theta}}\right) \tag{2}$$

where d and n are thickness and refractive index of the glass plate 30. It is noted that the incident angle θ by which the light ray is incident on the glass plate 30 is equal to the slanted angle θ at which the normal line N is slanted with respect to the optical axis Z.

It is therefore apparent that in the present example, the glass plate 30 should be slanted, with the slanted angle θ satisfying the following equation (3):

$$\frac{\sqrt{2}L}{4} = d\sin\theta \left(1 - \frac{\cos\theta}{\sqrt{n^2 - \sin^2\theta}}\right) \tag{3}$$

It is further noted that as apparent from FIGS. 5A and 5B, in order to match the center of each picture element (a–p) with the center of its neighboring light pick up element (11–19), it is necessary to shift the picture element by the shift amount $\Delta = 2^{(1/2)}L/4$ in either one of four different directions I, II, III and IV which are all shifted from the X axis (horizontal direction) by 45 degrees (=arc tan {(L/2)/(L/2)}). The first direction I directs upwardly and leftwardly, the second direction II directs upwardly and rightwardly, the third direction III directs downwardly and rightwardly, and the fourth direction IV directs downwardly and leftwardly. The plate 30 should therefore be rotated about the optical axis Z with the slanted angle θ being fixed so as to be located in four rotational positions to refract an incident light ray in the four directions I–IV, respectively.

Now, a directional plane P is defined for the plate 30 as a plane along which the plate 30 refracts an incident light ray. This directional plane P is defined as a plane normal to the plate 30 and along which the normal line N and the optical axis Z both extend. Light ray travels along the optical axis Z and is incident on the plate 30. The light ray is refracted by the plate 30 to travel along this directional plane P. When the plate 30 rotates about the optical axis Z with its normal line N fixedly slanted with respect to the optical axis Z, the directional plane P also rotates about the optical axis Z.

It is therefore apparent that successively locating the plate 30 at four rotational positions (I)–(IV) which cause the directional plane P to extend along the four directions I–IV allows the plate 30 to refract the incident light ray in the directions I–IV and shift the picture elements in the directions I–IV. Thus, rotating the plate 30 about the optical axis Z to successively locate it in the four rotational positions (I)–(IV) while maintaining the slanted angle θ to be fixed to the value satisfying the equation (3) causes the plate 30 to shift the respective picture elements a to p to reach the centers of their neighboring light pick up elements 11–19.

In order to rotate the glass plate 30 about the optical axis Z while maintaining the slanted angle θ to be fixed to the value satisfying the equation (3), the present embodiment fixedly mounts the plate 30 in the rotational stand 40 in such a state that the plate 30 is slanted with respect to the optical axis Z by the slanted angle θ. The rotational stand 40 has a ring-shaped gear 41, at its outer peripheral surface, which is engaged with a gear provided to the motor 50. Driving the stepper motor 50 therefore causes the rotational stand 40 to rotate about the optical axis Z, which in turn rotates the planar plate 30 while maintaining the slanted angle θ.

Figure 6B:
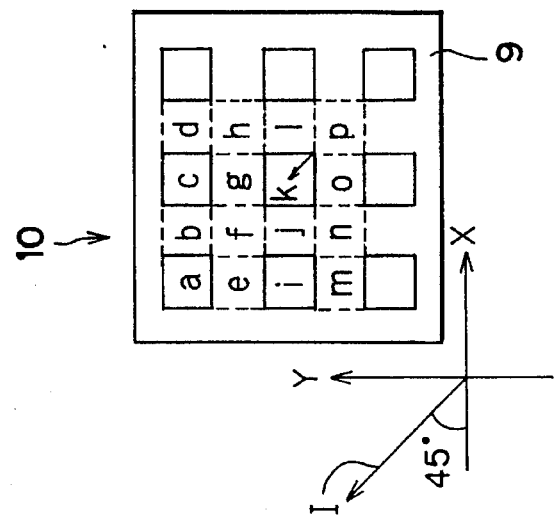
FIGS. 6A and 6B are a perspective view and a plan view both schematically showing how the picture elements a–p are imaged on the image-receiving surface 9 of the image sensor when the glass plate 30 is located in a first rotational position (I)
Figure 6A:
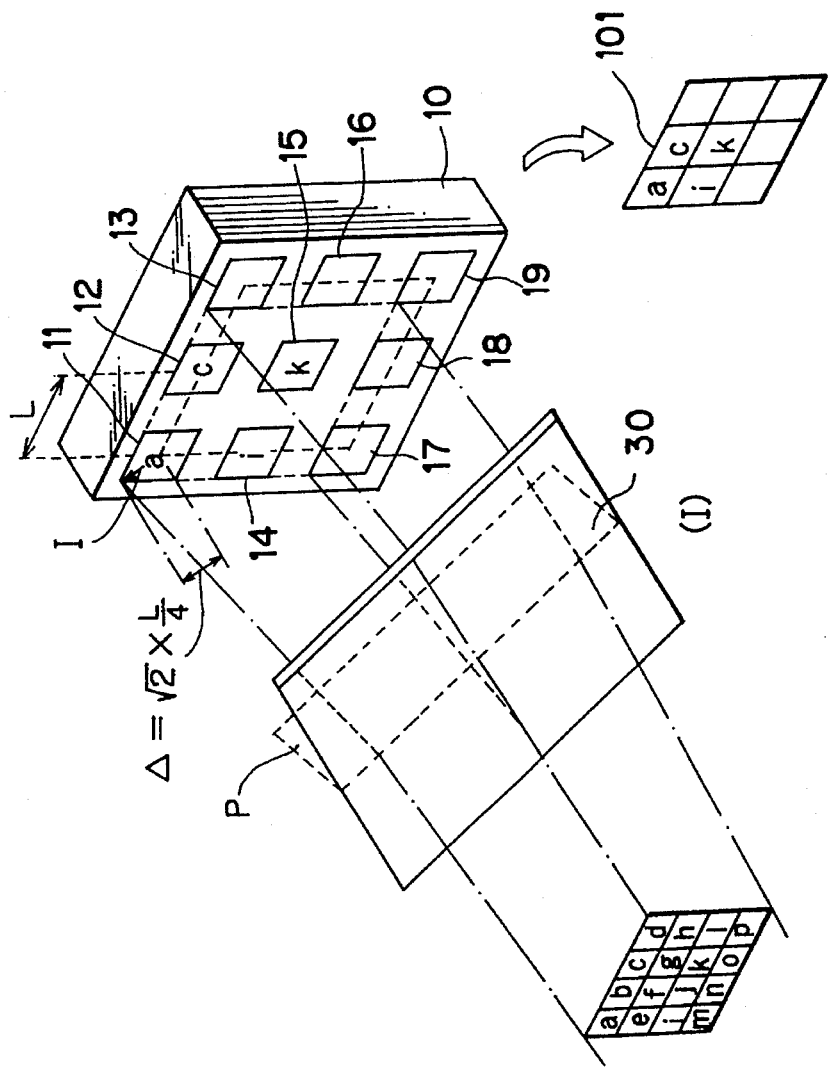

FIGS. 6A and 6B show the state that the stepper motor 50 rotates the rotational stand 40 to locate the plate 30 in the first rotational position (I) which causes the directional plane P to extend along the first direction I. The plate 30 in this state refracts the incident light ray in the first direction I with the shift amount Δ. As a result, all the picture elements a to p of the optical image are shifted by the shift amount Δ in the first direction I. The picture elements a, c, i and k enter the light pick up elements 11, 12, 14 and 15 to be picked up thereby.

Figure 7B:
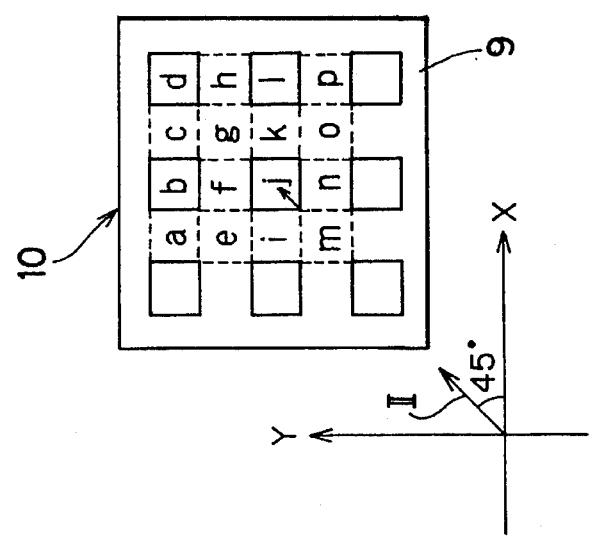
FIGS. 7A and 7B are a perspective view and a plan view both schematically showing how the picture elements a–p are imaged on the image-receiving surface 9 of the image sensor when the glass plate 30 is located in a second rotational position (II)
Figure 7A:
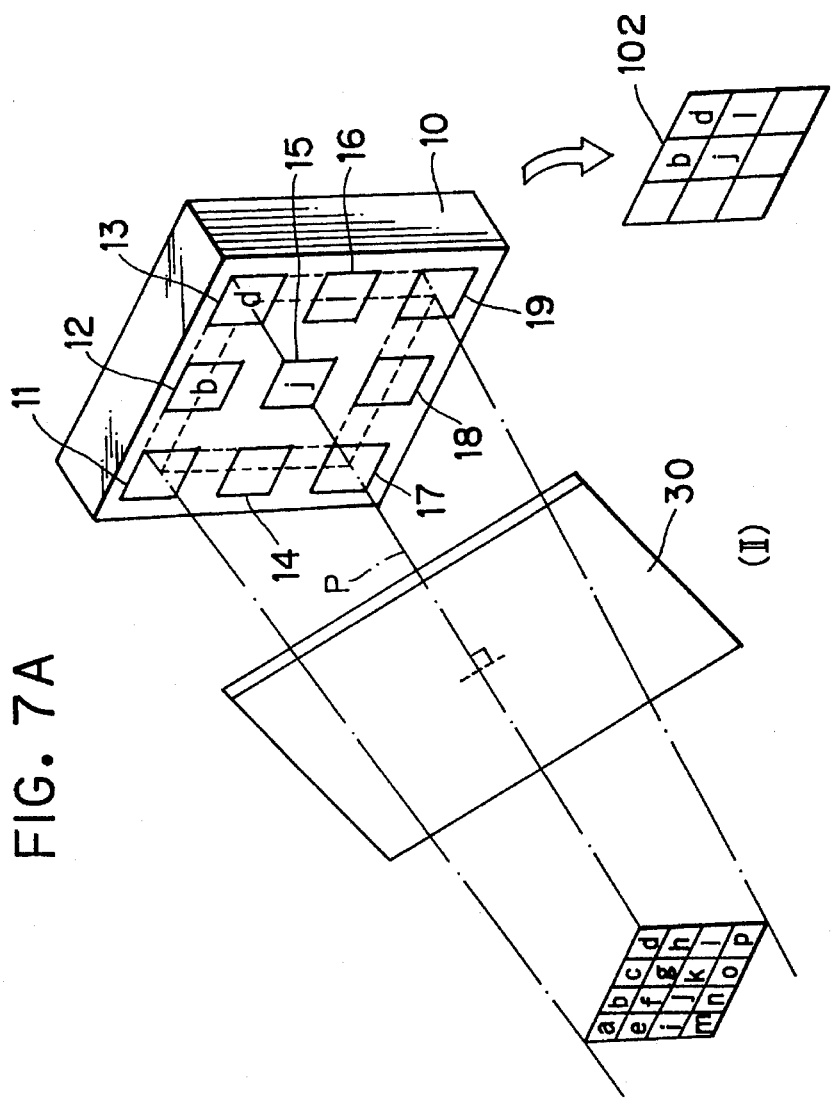

FIGS. 7A and 7B show the state that the stepper motor 50 rotates the rotational stand 40 to locate the plate 30 in the second rotational position (II) which cause the directional plane P to extend along the second direction II. The plate 30 in this state refracts the incident light ray in the second direction II with the shift amount Δ. As a result, all the picture elements a to p are shifted by the shift amount Δ in the second direction II. The picture elements b, d, i and l enter the light pick up elements 12, 13, 15 and 16 to be picked up thereby.

Figure 8B:
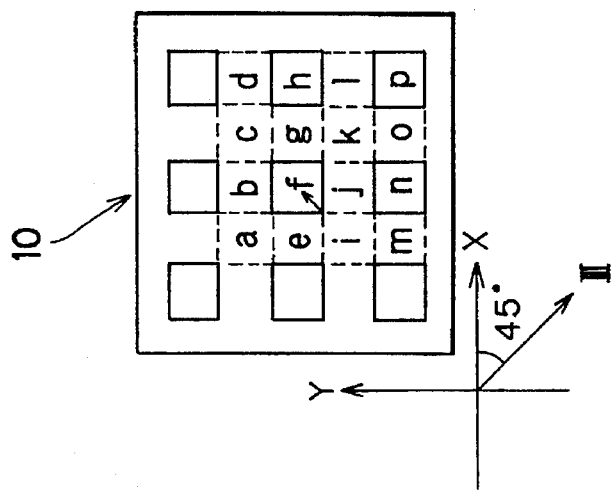
FIGS. 8A and 8B are a perspective view and a plan view both schematically showing how the picture elements a–p are imaged on the image-receiving surface 9 of the image sensor when the glass plate 30 is located in a third rotational position (III)
Figure 8A:
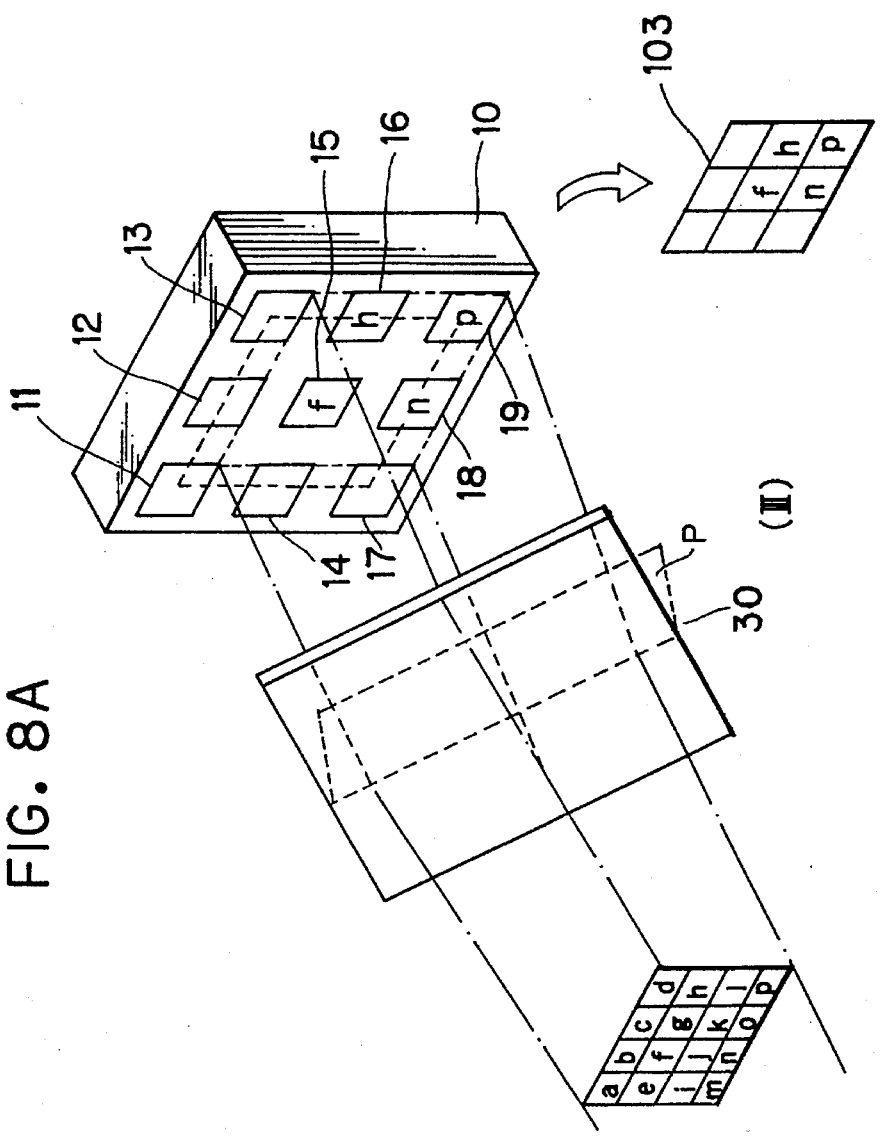

FIGS. 8A and 8B show the state that the stepper motor 50 rotates the rotational stand 40 to locate the planar plate 30 in the third rotational position (III) which causes the directional plane P to extend along the third direction III. The planar plate 30 refracts the incident light ray in the third direction III with the shift amount Δ. As a result, all the picture elements a to p are shifted by the shift amount Δ in the third direction III. The picture elements f, h, n and p enter the light pick up elements 15, 16, 18 and 19 to be picked up thereby.

Figure 9B:
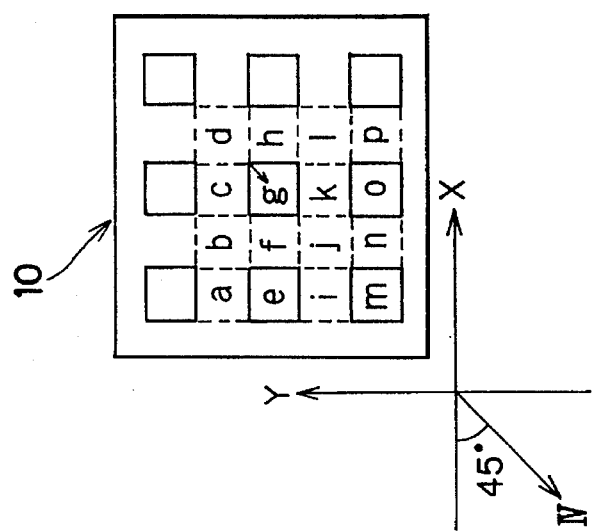
FIGS. 9A and 9B are a perspective view and a plan view both schematically showing how the picture elements a–p are imaged on the image-receiving surface 9 of the image sensor when the glass plate 30 is located in a fourth rotational position (IV)
Figure 9A:
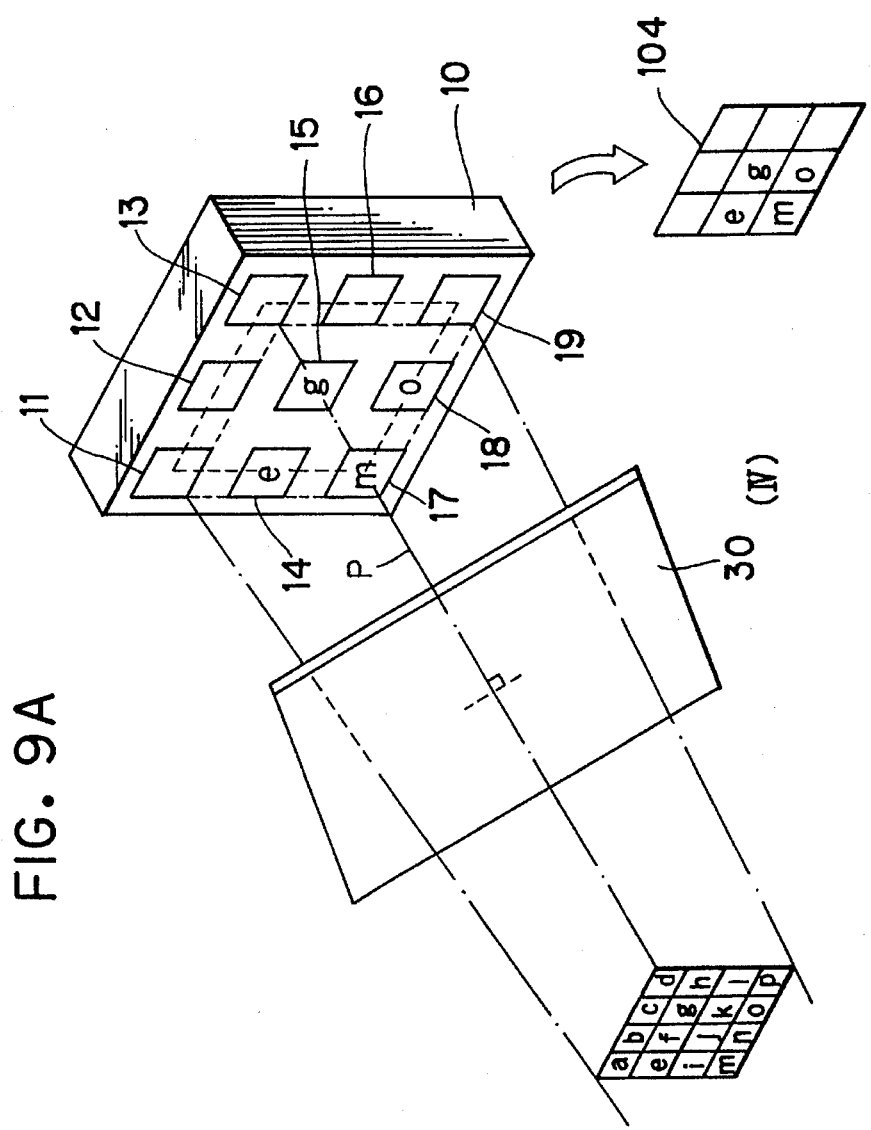

FIGS. 9A and 9B show the state that the stepper motor 50 rotates the rotational stand 40 to locate the planar plate 30 in the fourth rotational position (IV) which causes the directional plane P to extend along the fourth direction IV. The plate 30 refracts the incident light ray in the fourth direction IV with the shift amount Δ. As a result, all the picture elements a to p are shifted by the shift amount a in the fourth direction IV. The picture elements e, q, m and o enter the light pick up elements 14, 15, 17 and 18 to be picked up thereby.

According to the present embodiment, the stepper motor 50 rotates the rotational stand 40 in a clockwise direction to successively locate the planar plate 30 into the four rotational positions (I)–(IV) as shown in FIGS. 10A–10D, which cause the directional plane P to extend along the four directions I–IV. It is noted that the four directions I–IV are all shifted from the horizontal direction (X direction) by the shift angle φ defined by the following equation (4):

$$\phi = \arctan(L/L) = 45 \text{ degrees} \tag{4}$$

Figure 10A:
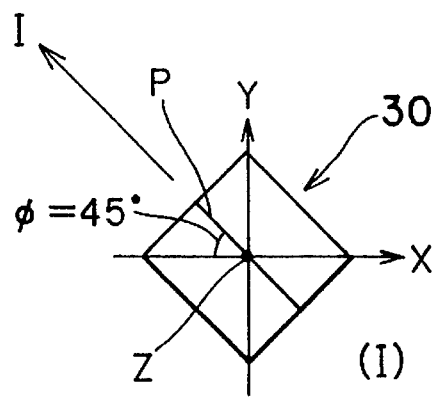
FIGS. 10A through 10D are plan views of the planar plate 30 located in the four rotational positions (I)–(IV)
Figure 10B:
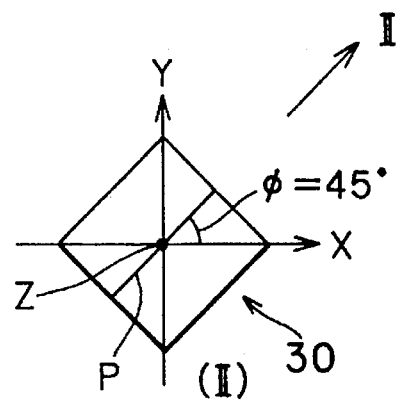
Figure 10C:
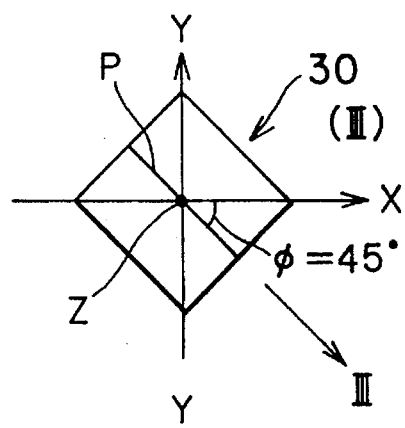
Figure 10D:
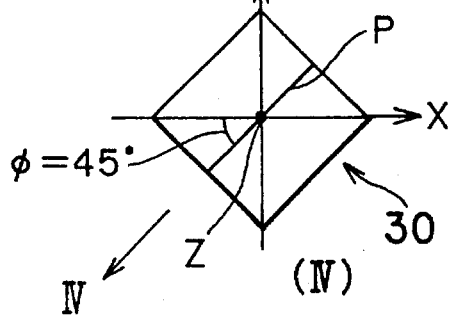

Accordingly, the stepper motor 50 initially locates the rotational stand 40 so that the planar plate 30 is located at the first rotational position (I) with the directional plane P being shifted by 45 degrees from the horizontal direction upwardly and leftwardly, as shown in FIG. 10A. Then, the stepper motor 50 repeatedly rotates the rotational stand 40 by the rotation amount of 90 degrees in a clockwise direction. As a result, the planar plate 30 is successively located in the rotational positions (II)–(IV) where the directional plane P is shifted by 45 degrees from the horizontal direction, upwardly and rightwardly (FIG. 10B), downwardly and rightwardly (FIG. 10C), and downwardly and leftwardly (FIG. 10D), respectively.

According to the present embodiment, the control device 80 controls the above-described driving operation of the stepper motor 50. The control device 80 further controls the image sensor 10 to pick up the incident light image every time when the rotational stand 40 rotates by 90 degrees. More specifically, the control device 80 controls the image sensor 10 to pick up a first image 101 shown in FIG. 6A at the initial time when the stepper motor 50 locates the planar plate 30 in the first rotational position (I). Then, the control device 80 controls the image sensor 10 to pick up second through fourth images 102, 103 and 104 shown in FIGS. 7A–9A at the time when the stepper motor 50 locates the planar plate 30 in the second through fourth rotational positions (II)–(IV). Accordingly, when the rotational stand 40 rotates completely by 360 degrees, the image sensor 10 has picked up the four images 101–104 which are shifted horizontally and vertically by the shift amount (L/2) that is equal to a half of the interval L between the neighboring light pick up elements of the image sensor.

Figure 11:
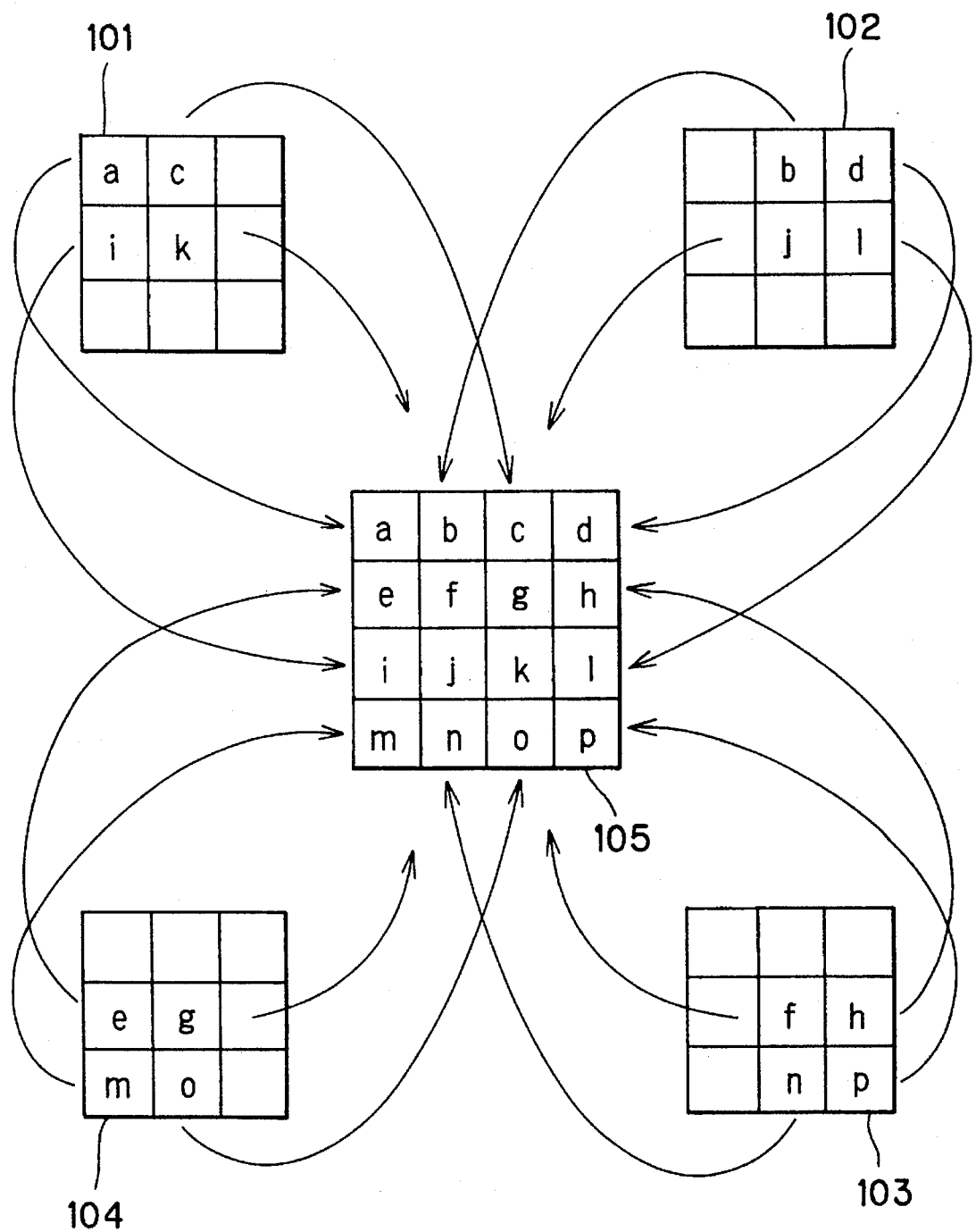
FIG. 11 illustrates how the picked up images are composed into a final image.

When receiving each of the four optical images 101–104, the image sensor 10 photoelectrically converts the optical image into electrical signals (image data). The image sensor 10 supplies the electrical signals to the memory device 60 where the electrical signals are temporarily stored. When the image data for the four images 101–104 are all supplied to the memory device 60, the control device 80 instructs the memory device to feed all the image data to the composing device 70. The composing device 70 calculates the image data for the four images 101–104 so as to compose or synthesize the four images into a final composite image 105, as shown in FIG. 11. The composing device then outputs image data (electrical signals) representative of the thus obtained final composite image. It is noted that in order to compose the four images 101–104, the images 101–104 are located on every other picture elements of a final image 105 to be obtained. Each of the four images 101–104 has the picture elements arranged with an interval L equal to the interval with which the light pick up elements of the image sensor 10 are arranged. Accordingly, thus locating the images 101–104 on every other picture element of the final image 105 causes the final image 105 to have their picture elements arranged with an interval of L/2 that is a half of the interval L of the images 101–104, i.e., the interval with which the light pick up elements 11–19 are arranged on the image sensor 10.

It is noted that while the plate 30 is rotated by 360 degrees to be located in the four rotational positions (I)–(IV), the single light pick up element 15 successively picks up the four picture elements k, j, f and g, as shown in FIGS. 6B–9B. Thus, according to the present embodiment, each single light pick up element can pick up four picture elements at maximum. Accordingly, the solid-state image pick up device 1 of this embodiment can pick up an image composed of picture elements with the number of four times larger than the number of light pick up elements constituting the image sensor 10. In other words, as described above, the solid-state image pick up device can obtain a final image 105 which has picture elements arranged vertically and horizontally at interval of L/2 that is a half of the interval with which the light pick up elements 11–19 are arranged vertically and horizontally on the image sensor 10.

The operation of the above-constructed solid-state image pick up device 1 of the embodiment will be described below with reference to the schematic views of FIGS. 6 through 11.

A light source (not shown) continuously emits the optical image consisting of the picture elements a through p, so that the lens 20 continuously forms the optical image on the image sensor 10. The control device 80 starts driving the stepper motor 50 to rotate the rotational stand 40. The control device 80 stops driving the stepper motor 50 when the planar plate 30 reaches the first rotational position (I) shown in FIG. 6A and 10A. Simultaneously, the control device 80 controls the image sensor 10 to convert the received optical image into electrical signals. Because the four light pick up elements 11, 12, 14 and 15 pick up the picture elements "a", "c", "i" and "k", respectively, the image sensor 10 outputs image data representative of the image 101 to the memory device 60. The memory device 60 temporarily stores the image data.

Then, the control device 80 again starts driving the stepper motor 50 to rotate the rotational stand 40 in the clockwise direction. The control device 80 stops driving the stepper motor 50 when the rotational stand 40 rotates by 90 degrees to locate the planar plate 30 in the second rotational position (II) shown in FIGS. 7A and 10B. Simultaneously, the control device 80 controls the image sensor 10 to convert the received optical image into electrical signals. Because the four light pick up elements 12, 13, 15 and 16 pick up the picture elements "b", "d", "j" and "l", respectively, the image sensor 10 outputs image data representative of the image 102 to the memory device 60. The memory device 60 temporarily stores the image data.

Then, the control device 80 again starts driving the stepper motor 50 to rotate the rotational stand 40 in the clockwise direction. The control device 80 stops driving the stepper motor 50 when the rotational stand 40 rotates by 90 degrees to locate the planar plate 30 in the third rotational position (III) shown in FIGS. 8A and 10C. Simultaneously, the control device 80 controls the image sensor 10 to convert the received optical image into electrical signals. Because the four light pick up elements 15, 16, 18 and 19 pick up the picture elements "f", "h", "n" and "p", respectively, the image sensor 10 outputs image data representative of the image 103 to the memory device 60. The memory device 60 temporarily stores the image data.

Then, the control device 80 starts driving the stepper motor 50 to further rotate the rotational stand 40 in the clockwise direction. The control device 80 stops driving the stepper motor 50 when the rotational stand 40 rotates by 90 degrees to locate the planar plate 30 in the fourth rotational position (IV) shown in FIGS. 9A and 10D. Simultaneously, the control device 80 controls the image sensor 10 to convert the received optical image into electrical signals. Because the four light pick up elements 14, 15, 17 and 18 pick up the picture elements "e", "g", "m" and "o", respectively the image sensor 10 outputs image data representative of the image 104 to the memory device 60. The memory device 60 temporarily stores the image data.

When the image data for the four images 101 through 104 are all stored in the memory device 60, the control device 80 instructs the memory device 60 to transfer the image data for all the images 101 through 104 to the composing device 70. As shown in FIG. 11, the composing device 70 locates the images 101–104 on every other picture elements of the final image 105 so as to produce the final image 105.

It is noted that in the above-described embodiment, each of the light pick up elements 11–19 is of a square shape with its side length of L/2. However, the side length may be freely selected in a range shorter than L. Additionally, the shapes of the light pick up elements 11–19 may not be limited to the square shapes. The light pick up elements may be of various shapes.

Figure 13:
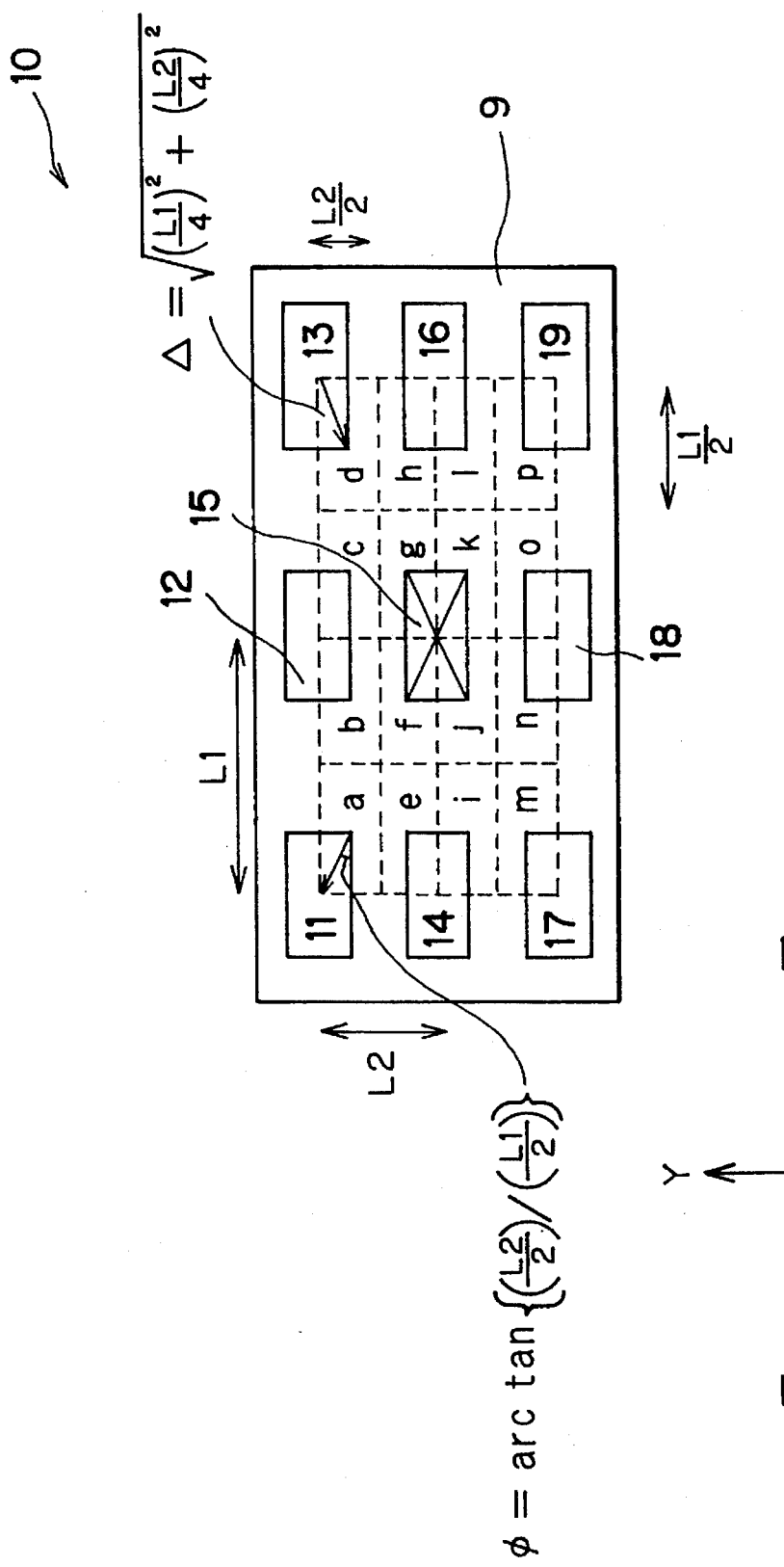
FIG. 13 schematically shows how the light pick up elements are arranged on the image-receiving surface 9 of the image sensor according to a modification of the present invention and how the optical image is formed on the image-receiving surface.

A modification of the embodiment is described below with reference to FIG. 13.

The image sensor 10 employed in the above-described embodiment has the plurality of light pick up elements arranged with the same interval L in the vertical direction and in the horizontal direction. However, it is possible to employ image sensors 10 with their light pick up elements being arranged in various manners. For example, it is possible to employ such an image sensor as has the light pick up elements 11–19 arranged by different intervals L1 and L2 in the horizontal and vertical directions as shown in FIG. 13. Each of the light pick up elements 11–19 has a rectangular shape with its side lengths being L1/2 and L2/2, for example. As will be described below, the solid-state image pick up device employed with this type of image sensor 10 can pick up picture elements a–p imaged by the lens 20, as shown in FIG. 13. That is, the lens 20 images the optical image so that the picture elements are arranged with different intervals L1/2 and L2/2 in the horizontal and vertical directions, respectively. The converging lens 20 images the optical image to be located relative to the light pick up elements as shown in FIG. 13 when the plate 30 is not provided or is provided normal to the optical axis Z. More specifically, the converging lens 20 images the optical image with its picture elements being located at positions which are equidistant from their neighboring light pick up elements by the distance Δ satisfying the following equation (5):

$$\Delta = \sqrt{\left(\frac{L1}{4}\right)^2 + \left(\frac{L2}{4}\right)^2} \quad (5)$$

In order to shift the picture elements a to p to the centers of their neighboring light pick up elements and cause the image sensor to pick up the picture elements. The glass plate 30 should be mounted in the rotational stand 40 to be slanted by the slanted angle θ satisfying the following equation (6):

$$\sqrt{\left(\frac{L1}{4}\right)^2 + \left(\frac{L2}{4}\right)^2} = d\sin\theta \left(1 - \frac{\cos\theta}{\sqrt{n^2 - \sin^2\theta}}\right) \quad (6)$$

The plate 30 should be rotated to be located in four rotational positions which cause the directional plane P to extend along four directions which are slanted from the horizontal direction (X direction) by the same angle φ satisfying the following equation (7):

φ=arc tan {(L2/2)/(L1/2)}　　(7).

The four directions are slanted, by the angle φ from the horizontal direction, in an upward-and-leftward direction, an upward-and-rightward direction, a downward-and-rightward direction and a downward-and-leftward direction, respectively, similarly to the directions I–IV in the above-described embodiment. Accordingly, the stepper motor 50 should be driven to rotate the rotational stand 40 to successively locate the glass plate 30 in the four rotational positions. Controlling the image sensor 10 to pick up four images obtained by the planar plate 30 located in the four rotational positions causes each light pick up element to pick up four different picture elements at maximum, in the same manner as in the above-described embodiment.

It is noted that in this modification, the shapes of the light pick up elements may not be particularly limited to the rectangular shapes. The light pick up elements may be of square shapes or other various shapes.

As apparent from the above description, according to the present invention, the planar plate 30 fixedly slanted by the slanted angle θ with respect to the optical axis Z can shift any image portions formed on the image sensor 10 by a distance Δ determined by the slanted angle θ by the equation (2). Rotating the planar plate 30 about the optical axis Z to cause its directional plane P to extend along an arbitrary direction can shift the picture elements in the arbitrary direction. Accordingly, it is possible to cause the image sensor 10 to pick up any image portions that are imaged by the converging lens 20 on the image sensor 10 at positions equidistant from their neighboring light pick up elements in any direction.

In the above description, the plate 30 is successively located in the four rotational positions. Accordingly, each light pick up element can successively pick up the four different image portions which are equidistant from the corresponding light pick up element. However, if the plate 30 is located in more than four rotational positions, each light pick up element can pick up the corresponding number of image portions that are equidistant from the corresponding light pick up element. More specifically, in the above-described embodiment employed with the image sensor of FIG. 4, the image sensor 10 achieves its image pick up operation every time when the glass plate 30 rotates by 90 degrees. Accordingly, while the plate rotates by one turn, i.e., by 360 degrees, each light pick up element can pick up the four image portions that are equidistant from the corresponding light pick up element but are shifted by 90 degrees from one another. However, the image sensor 10 may achieve its image pick up operation every time when the glass plate 30 rotates by 45 degrees, for example. In this case, while the plate rotates by one turn (360 degrees), each light pick up element can pick up eight image portions that are equidistant from the corresponding light pick up element but are shifted by 45 degrees from one another.

Figure 14:
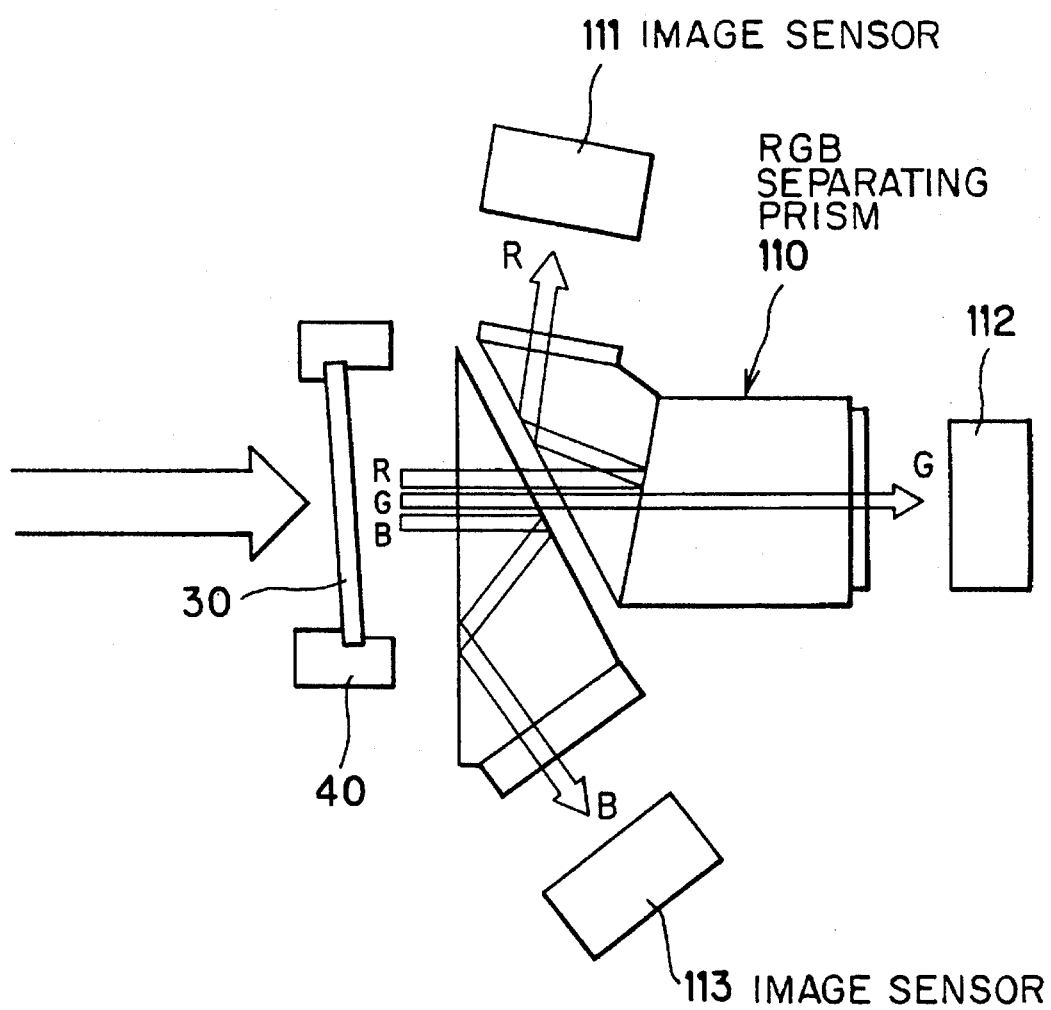
FIG. 14 is a sectional view of a characterized part of a solid-state image pick up device of another modification of the present invention capable of picking up color images.

A further modification of the solid-state image pick device of this embodiment will be described below with reference to FIG. 14.

According to this modification, the image sensor 10 is replaced with a combination of a RGB separating prism 110 and three image sensors 111 through 113 for picking up R, G and B color-component light images separated by the prism 110. The incident light refracted by the planar glass plate 30 enters the RGB separation prism 110 where the light is separated into red, green and blue color-component lights. These color-component lights are incident on the image sensors 111–113, respectively. Thus, the image sensors 111–113 pick up, in combination, a color image. Picking up a plurality of color images while rotating the rotational stand 40 and composing the obtained plurality of color images can obtain a high quality color image.

Figure 15:
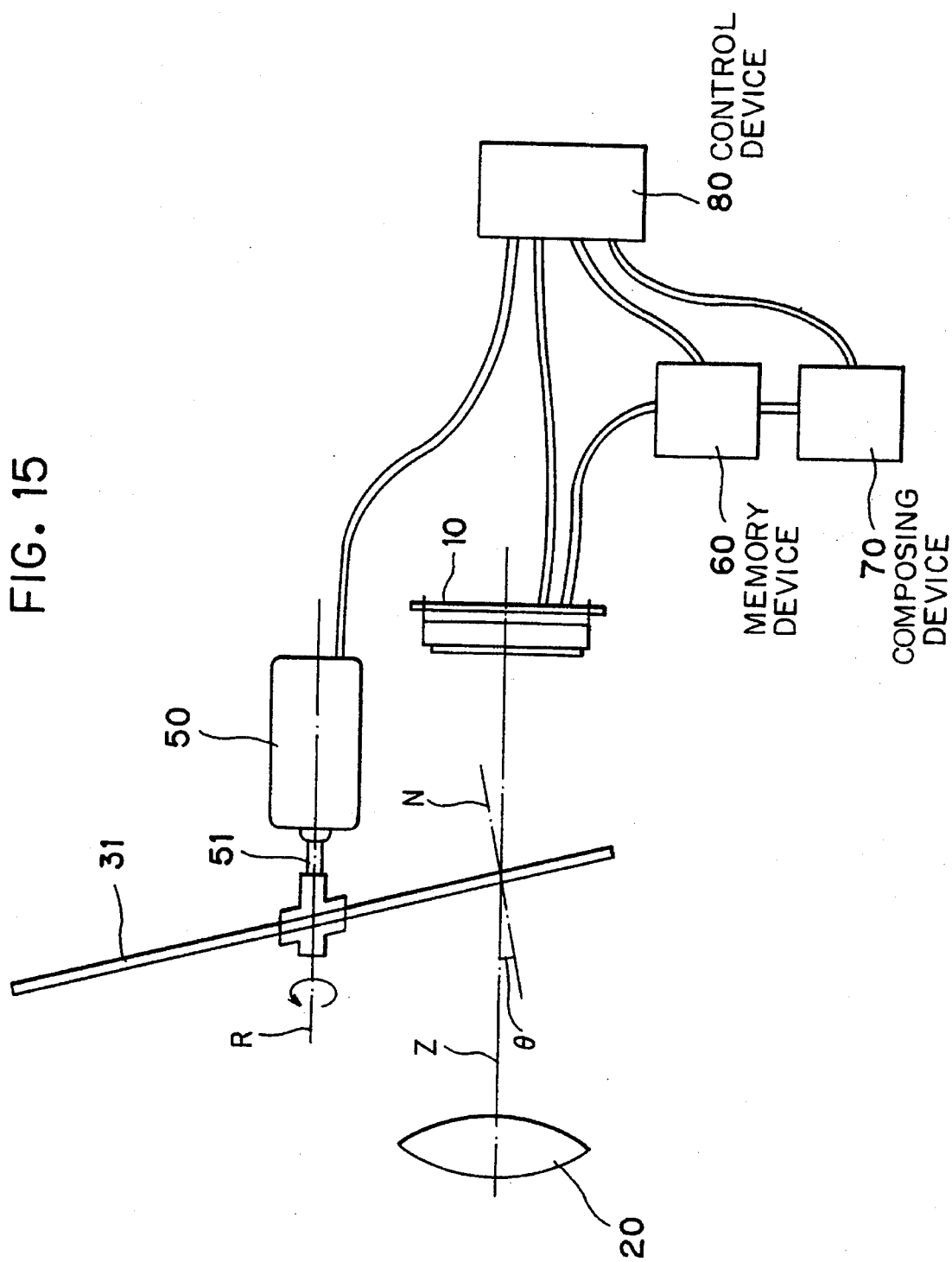
FIG. 15 is a sectional view showing a structure of a solid-state image pick up device of a further modification of the present invention.

The solid-state image pick up device may also be modified as shown in FIG. 15. In this modification, the planar glass plate 30 of the embodiment of FIG. 2 is replaced with another planar glass plate 31 having a wider area than that of the glass plate 30. The planar glass plate 31 is directly rotated by the stepper motor 50. Accordingly, the rotational stand 40 can be omitted. The stepper motor 50 is provided with a rotational shaft 51 rotatable about its rotational axis R. The stepper motor 50 is located with the rotational axis R extending parallel to the optical axis Z of the converging lens 20. The planar glass plate 31 is slantedly mounted to the rotational axis R of the stepper motor 50 with the slanted angle θ satisfying the equation (3).

Similarly to the above-described embodiment, in this modification, the stepper motor 50 should be driven to rotate the planar glass plate 31 to locate it in the four rotational positions (I)–(IV) with its directional plane P extending along the four directions I–IV. As a result, the image portions imaged on the image sensor 10 shift as shown in FIGS. 6A–9A. Thus, the present modification obtains the similar effects as obtained by the embodiment.

While the invention has been described in detail with reference to a specific embodiment thereof, it would be apparent to those skilled in the art that various changes and modifications may be made therein without departing from the spirit of the invention.

For example, in the above-described embodiment, images are picked up every time when the rotational stand 40 is rotated by 90 degrees. It is unnecessary to stop rotating the rotational stand 40 while images are being picked up. Images may be picked up while the stand is rotating.

The rotational stand 40 may be rotated continuously at a fixed rate so as to cause the image formed on the image receiving surface 9 to drift or wander therealong. Generally, Moire patterns are liable to generate when an image with its picture elements being highly accurately arranged with a predetermined interval is picked up by a plurality of light pick up elements which are also highly accurately arranged with a different interval. However, in this modification, causing the picture elements of the image to achieve the drifting or wandering motion with a speed not synchronized with the pick up speed of the image sensor can deteriorate the accuracy by which the picture elements are arranged, thereby preventing the Moire pattern from generating.

In the above-described embodiment, the plurality of images picked up while the rotational stand 40 is rotated are temporarily stored in the memory device 60 before being transferred to and composed by the composing device 70. However, the memory device 60 may be omitted. The image sensor 10 may transfer the images directly to the composing device 70. The composing device 70 may compose thus transferred images one by one.

The motor 50 is not limited to a stepper motor. Any kinds of motor may be applicable to the motor 50.

As described above, the solid-state image pick up device of the present invention can obtain an effect that is equivalent to increase the number of light pick up elements employed in the image sensor.

The slanted angle θ of the planar plate with respect to the optical axis of the optical system is unchanged when the planar plate rotates. Accordingly, it is possible to prevent lowering of the quality of the image picked up by the image sensor.

It is easily possible to accurately adjust the slanted angle θ of the planar plate. Adjusting the slanted angle θ to have a very small angle makes small the refraction angle, at which the glass plate 30 refracts the incident light. It therefore becomes possible to make small the shift amount of the position at which the refracted incident light images shifts on the image sensor, which results in further increase in the quality of the image picked up by the image sensor.

The drive means for rotating the planar plate may be constructed from only a single motor. The device thus employed with the single motor is smaller relative to the conventional device necessarily provided with the two motors.

As apparent from the above, the present invention can accurately shift images in space with a simple structure and with a low cost.

What is claimed is:

1. A solid-state image pick up device for picking up an optical image, comprising:

an image sensor having an image receiving surface;

an optical system for imaging an incident light, which bears thereon an optical image, on the image receiving surface of the image sensor;

a transparent planar plate provided with two opposite planar surfaces parallel to each other;

a rotational stand, having the transparent plate mounted therein, which positions the transparent planar plate in front of the image receiving surface of the image sensor and slanted at a predetermined angle with respect to an optical axis of the optical system for refracting the incident light from the optical system;

drive means for rotating the rotational stand and the planar plate about one of the optical axis and an axis parallel to the optical axis by a predetermined rotational angle, the rotational stand maintaining the predetermined slanted angle of the planar plate during rotation; and composing means for composing, into a final composite image, a plurality of optical images each being picked up by the image sensor every time when the drive means rotates the planar plate by the predetermined rotational angle.

2. A solid-state image pick up device as claimed in claim 1, wherein the drive means rotates the planar plate about the optical axis to successively locate the planar plate at a plurality of rotational positions, and wherein the image sensor picks up the plural optical images formed at the time when the planar plate is located at the plurality of rotational positions.

3. A solid-state image pick up device as claimed in claim 2, wherein the image receiving surface of the image sensor is located normal to the optical axis and has a plurality of light pick up elements arranged thereon, and wherein the planar plate is slanted with respect to the optical axis to form the predetermined slanted angle θ defined between the optical axis and a normal line normal to the planar plate satisfying the equation $$\Delta = d\sin\theta \left( 1 - \frac{\cos\theta}{\sqrt{n^2 - \sin^2\theta}} \right)$$

where d and n are thickness between the opposite surfaces and refractive index of the planar plate, to thereby cause a plurality of image portions constituting the optical image formed on the image receiving surface that are originally located equidistant from each of the plurality of light pick up elements with a distance Δ to enter the corresponding light pick up element to be picked up thereby.

4. A solid-state image pick up device as claimed in claim 3, wherein the drive means rotates the planar plate while maintaining the predetermined slanted angle θ to successively locate the planar plate in the plurality of rotational positions where a directional plane of the planar plate, along which the normal line and the optical axis both extend, extends in a plurality of directions corresponding to the rotational positions, to thereby successively cause a plurality of image portions constituting the optical image formed on the image receiving surface that are originally located equidistant from each of the plurality of light pick up elements with the distance $\Delta$ in the plurality of directions to shift and enter the corresponding light pick up element to be picked up thereby.

5. A solid-state image pick up device as claimed in claim 1, wherein the rotational stand comprises a gear about its periphery, and wherein the drive means engages with the gear to rotate the rotational stand about the rotational axis.

6. A solid-state image pick up device as claimed in claim 2, wherein the image sensor includes:

a color-separation member for separating the incident light from the optical system into three color component light rays; and three image sensor portions for respectively receiving the three color light rays obtained by the color-separation prism.

7. A solid-state image pick up device as claimed in claim 2, wherein the composing means includes:

control means for controlling the image sensor to pick up the optical image formed on the image receiving surface every time when the drive means locates the planar plate at each of the plurality of rotational positions and to photoelectrically convert the picked up plurality of optical images into electrical data; and calculation means for calculating the electrical data for the plurality of optical images into resultant electrical data representative of the final composite image.

8. A solid-state image pick up device as claimed in claim 7, wherein the drive means successively rotates the planar plate by the predetermined rotational angle of 90 degrees to thereby locate the planar plate in four rotational positions while rotating it by 360 degrees, and wherein four images obtained while the planar plate is rotated by 360 degrees are composed by the calculation means into the final composite image.

9. A solid-state image pick up device as claimed in claim 8, wherein the image receiving surface of the image sensor is located normal to the optical axis and has a plurality of light pick up elements which are two-dimensionally arranged with an interval L, and wherein the slanted angle of the planar plate is determined so as to refract the incident light by a shift amount of $2^{(1/2)}L/4$, the planar plate rotated by 360 degrees by the drive means successively shifting, toward each light pick up element, four image portions that are originally formed by the optical system on the image receiving surface at four positions which are equidistant from the corresponding light pick up element with a distance of $2^{(1/2)}L/4$ in four directions shifted from one another by 90 degrees about the corresponding light pick up element.

10. A solid-state image pick up device as claimed in claim 9, wherein the control means controls the image sensor to pick up each of the four image portions that is received by the corresponding light pick up element when the drive means locates the planar plate at a corresponding one of the four rotational positions and to photoelectrically convert the each one of the four image portions into electrical data; and wherein the calculation means calculates the electrical data for the four image portions into resultant electrical data representative of the final composite image having the four image portions arranged to construct four neighboring picture elements of the final composite image.

11. A solid-state image pick up device as claimed in claim 7, wherein the composing means further includes storing means for receiving the electrical data from the image sensor, temporarily storing the electrical data until when the planar plate is located at all of the plurality of rotational positions, and for supplying the control means with the electrical data for all of the plurality of optical images obtained by the planar plate located at all of the plurality of rotational positions.

12. A solid-state image pick up device, for picking up an optical image, comprising:

an image sensor having an image receiving surface, on which a plurality of light pick up elements are arranged with a predetermined interval;

an optical system having an optical axis for introducing therealong a light beam bearing an optical image thereon to the image receiving surface of the image sensor, the optical system forming the optical image on the image receiving surface in such a state that a plurality of picture elements constituting the optical image are arranged to be located equidistant from at least one of the plurality of light pick up elements with a predetermined distance in a plurality of predetermined directions;

a transparent planar plate having two opposite planar surfaces parallel with each other;

a rotational stand, having the transparent plate mounted therein, which positions the transparent planar plate between the optical system and the image sensor for receiving the light beam from the optical system and guiding the light beam to the image sensor, the rotational stand mounting the transparent planar plate slanted at a predetermined angle with respect to the optical axis, the slanted angle being determined dependently on the predetermined distance so as to refract the light beam to shift the picture elements formed on the image receiving surface by a shift amount equal to the predetermined distance;

drive means for rotating the rotational stand and the planar plate about one of the optical axis and an axis parallel to the optical axis to locate the planar plate in a plurality of rotational positions determined dependently on the plurality of predetermined directions, the rotational stand maintaining the slanted angle of the planar plate during rotation, the planar plate located in each of the plurality of rotational positions refracting the light beam in a corresponding one of the predetermined directions by the predetermined shift amount to thereby cause the picture elements to enter the corresponding at least one light pick up element;

control means for controlling the image sensor to pick up the picture elements which are caused by the planar plate located in each of the plurality of rotational positions to enter the corresponding light pick up elements; and composing means for composing the picture elements picked up by the image sensor into a final composite image.

13. A solid-state image pick up device as claimed in claim 12, wherein the optical system forms the optical image on the image receiving surface in such a state that the plurality of picture elements are located equidistant from the at least one light pick up elements with the predetermined distance Δ, and wherein the planar plate is slanted with respect to the optical axis to form the slanted angle θ defined between the optical axis and a normal line normal to the two opposite surfaces of the planar plate satisfying the equation $$\Delta = d\sin\theta \left(1 - \frac{\cos\theta}{\sqrt{n^2 - \sin^2\theta}}\right)$$

where d and n are thickness and refractive index of the planar plate.

14. A solid-state image pick up device as claimed in claim 13, wherein the drive means rotates the planar plate to locate the planar plate in each of the plurality of rotational positions where a directional plane of the planar plate, along which the normal line and the optical axis both extend, extends along a corresponding one of the plurality of directions.

15. A solid-state image pick up device as claimed in claim 14,
wherein the drive means rotates the planar plate about one of the optical axis and the axis parallel to the optical axis to successively locate the planar plate in the plurality of rotational positions, and
wherein the control means controls the image sensor to pick up the optical image formed on the image receiving surface at the time when the planar plate is located in each of the plurality of rotational positions.

16. A solid-state image pick up device as claimed in claim 15, wherein the drive means stops rotating the planar plate while the control means controls the image sensor to pick up the optical image formed on the image receiving surface.

17. A solid-state image pick up device as claimed in claim 15, wherein the drive means continuously rotates the planar plate with a fixed rotational speed so that the planar plate may be successively located at the plurality of rotational positions.

18. A solid-state image pick up device as claimed in claim 15,
wherein the light pick up elements are arranged on the image receiving surface with the predetermined different intervals L1 and L2 in first and second directions, respectively,
wherein the optical system forms the optical image so that the picture elements are arranged with intervals L1/2 and L2/2 in the first and second directions, respectively, and a group of four picture elements are located around each light pick up element in such a manner that the four picture elements are positioned equidistant from the corresponding light pick up element by the distance Δ satisfying the following equation:

$$\Delta = \sqrt{\left(\frac{L1}{4}\right)^2 + \left(\frac{L2}{4}\right)^2}$$

and that the four picture elements are apart from the corresponding light pick up element in four directions which are shifted from the first direction by an angle φ satisfying the following equation:

φ=arc tan {(L2/2)/(L1/2)}, wherein the planar plate is slanted with the slanted angle θ satisfying the following equation, $$\sqrt{\left(\frac{L1}{4}\right)^2 + \left(\frac{L2}{4}\right)^2} = d\sin\theta \left(1 - \frac{\cos\theta}{\sqrt{n^2 - \sin^2\theta}}\right)$$

and wherein the drive means rotates the planar plate to locate it in four rotational positions where the directional plane extends along the four directions.

19. A solid-state image pick up device as claimed in claim 15,
wherein the light pick up elements are two-dimensionally arranged on the image receiving surface with the predetermined interval L,
wherein the optical system forms the optical image so that the picture elements are two-dimensionally arranged with an interval L/2 and a group of four picture elements are located around each light pick up element in such a manner that the four picture elements are positioned equidistant from the corresponding light pick up element by a distance $2^{1/2}L/4$ in four directions which are apart from one another by 90 degrees about the corresponding light pick up element,
wherein the planar plate is slanted with the slanted angle θ satisfying the following equation $$\frac{\sqrt{2}\,L}{4} = d\sin\theta \left(1 - \frac{\cos\theta}{\sqrt{n^2 - \sin^2\theta}}\right).$$

wherein the drive means rotates the planar plate to locate it in four rotational positions where the directional plane extends along the four directions.

20. A solid-state image pick up device as claimed in claim 19, wherein the composing means composes, into the final composite image, the picture elements picked up when the planar plate is located in the four rotational positions, in such a manner that each picture element is located on every other picture element of a final composite image to be obtained.

21. A solid-state image pick up device as claimed in claim 12, wherein the rotational stand comprises a gear about its periphery, and wherein the drive means engages with the gear to rotate the rotational stand about the rotational axis.

22. A solid-state image pick up device as claimed in claim 15, wherein the image sensor includes:
a color-separation member for separating the incident light from the optical system into three color component light rays; and
three image sensor portions for respectively receiving the three color component light rays obtained by the color-separation prism.

23. A solid-state image pick up device as claimed in claim 1, wherein the drive means includes:
a motor for performing a rotational drive; and
rotational drive transmission means for transmitting the rotational drive to the rotational stand, thereby rotating the rotational stand about the optical axis.

24. A solid-state image pick up device as claimed in claim 23,
wherein the rotational stand is provided with a gear about it periphery, and
wherein the rotational drive transmission means includes a gear member mounted to the motor in engagement with the gear.

25. A solid-state image pick up device as claimed in claim 12,
wherein the rotational stand is substantially of a cylindrical shape with its axis extending along the optical axis, and wherein the drive means includes:
a motor for rotating a wheel about an axis parallel to the optical axis; and
rotational motion transmitting means for transmitting the rotational motion of the wheel to the rotational stand, thereby rotating the rotational stand about the optical axis.

26. A solid-state image pick up device as claimed in claim 25, wherein the rotational motion transmitting means includes a first gear provided about a periphery of the rotational stand and a second gear provided about a periphery of the wheel, the first and second gears being in engagement with each other.

* * * * *